(12) United States Patent
Höglund et al.

(10) Patent No.: US 12,477,465 B2
(45) Date of Patent: Nov. 18, 2025

(54) METHODS AND DEVICES FOR REDUCING UE ENERGY CONSUMPTION

(71) Applicant: Telefonaktiebolaget LM Ericsson (publ), Stockholm (SE)

(72) Inventors: Andreas Höglund, Solna (SE); Luca Feltrin, Solna (SE); Istiak Hossain, Kista (SE); Yutao Sui, Solna (SE); Jonas Kronander, Knivsta (SE); Kittipong Kittichokechai, Järfälla (SE); Stefan Wänstedt, Luleå (SE); Oscar Ohlsson, Bromma (SE); Mohammad Mozaffari, Fremont, CA (US)

(73) Assignee: Telefonaktiebolaget LM Ericsson (publ), Stockholm (SE)

( * ) Notice: Subject to any disclaimer, the term of this patent is extended or adjusted under 35 U.S.C. 154(b) by 380 days.

(21) Appl. No.: 17/788,339

(22) PCT Filed: Feb. 12, 2021

(86) PCT No.: PCT/SE2021/050118
§ 371 (c)(1),
(2) Date: Jun. 23, 2022

(87) PCT Pub. No.: WO2021/162622
PCT Pub. Date: Aug. 19, 2021

(65) Prior Publication Data
US 2023/0043517 A1    Feb. 9, 2023

Related U.S. Application Data

(60) Provisional application No. 62/976,736, filed on Feb. 14, 2020.

(51) Int. Cl.
*H04W 4/00*    (2018.01)
*H04W 24/08*    (2009.01)
(Continued)

(52) U.S. Cl.
CPC ....... *H04W 52/0235* (2013.01); *H04W 24/08* (2013.01); *H04W 74/0841* (2013.01)

(58) Field of Classification Search
USPC .................. 370/252, 329, 300, 333, 338
See application file for complete search history.

(56) References Cited

U.S. PATENT DOCUMENTS

| | | |
|---|---|---|
| 10,129,830 B2 | 11/2018 | Koc et al. |
| 2014/0018085 A1 | 1/2014 | Young et al. |
| 2020/0120596 A1* | 4/2020 | Yu ..................... H04W 52/0216 |

FOREIGN PATENT DOCUMENTS

| | | | |
|---|---|---|---|
| EP | 3609279 A1 | 2/2020 | |
| WO | WO-2020060890 A1 * | 3/2020 | ........ H04W 52/0216 |

OTHER PUBLICATIONS

Author Unknown, "Technical Specification Group Radio Access Network; NR; Study on User Equipment (UE) power saving in NR (Release 16)," Technical Report 38.840, Version 16.0.0, Jun. 2019, 3GPP Organizational Partners, 74 pages.
(Continued)

*Primary Examiner* — Zewdu A Beyen
(74) *Attorney, Agent, or Firm* — Withrow & Terranova, PLLC

(57) ABSTRACT

A method is disclosed herein for reducing energy consumption in a wireless device. A wireless device (e.g., a user equipment) can provide an indication to a network node (e.g., a base station) to indicate that the wireless device will prioritize energy consumption reduction over some network requirements (e.g., latency and/or scheduling flexibility requirements). Accordingly, the wireless device can perform certain power-saving actions to reduce energy consumption. The network node, upon receiving the indication from the wireless device, can perform certain network-related actions to assist the wireless device in reducing energy consumption. As a result, it is possible for the wireless device to (Continued)

reduce energy consumption and complexity, thus helping to prolong battery life in the wireless device.

18 Claims, 15 Drawing Sheets

(51) Int. Cl.
*H04W 52/02* (2009.01)
*H04W 74/0833* (2024.01)

(56) References Cited

OTHER PUBLICATIONS

Apple, et al., "R2-1702335: FeMTC UE CE mode and maximum PDSCH/PUSCH BW preference indication," 3GPP TSG-RAN WG2 Meeting #97, Feb. 13-17, 2017, Athens, Greece, 45 pages.

Catt, "R5-186768: Modify the values of IEs in sps-AssistanceInformation-r14," 3GPP TSG-RAN5 Meeting #81, Nov. 12-16, 2018, Spokane, Washington, 3 pages.

Ericsson, "RP-193238: New SID on support of reduced capability NR devices," 3GPP TSG RAN Meeting #86, Dec. 9-12, 2019, Sitges, Spain, 5 pages.

Nokia Siemens Networks, "R2-123693: Details of Assitance Information," 3GPP TSG-RAN WG2 Meeting #79, Aug. 13-17, 2012, Qingdao, China, 14 pages.

Zte, "RP-192572: Work Item on NR small data transmissions in Inactive state," 3GPP TSG RAN Meeting #86, Dec. 9-12, 2019, Sitges, Spain, 4 pages.

International Search Report and Written Opinion for International Patent Application No. PCT/SE2021/050118, mailed May 19, 2021, 11 pages.

Examination Report for European Patent Application No. 21707419.4, mailed Jul. 16, 2024, 8 pages.

\* cited by examiner

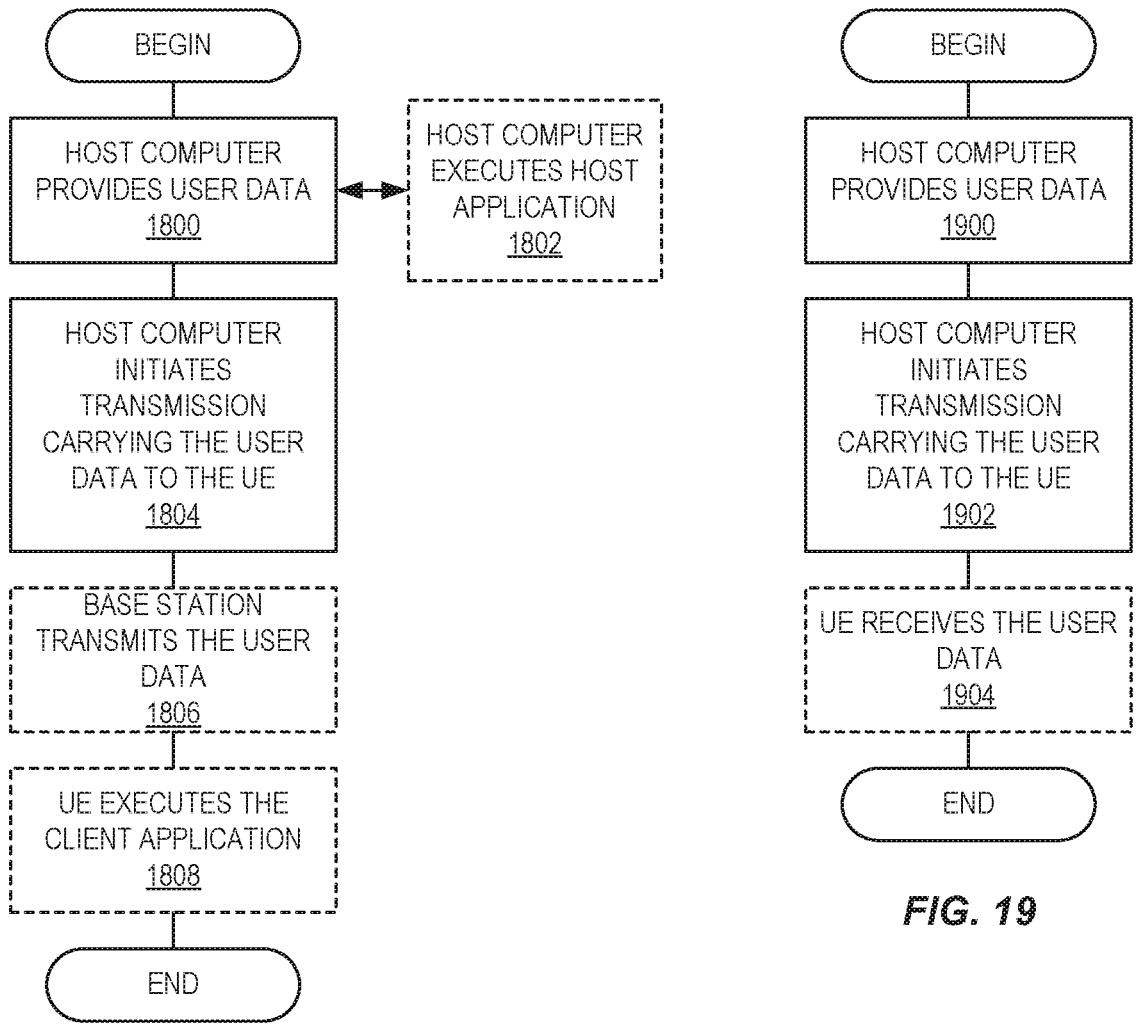

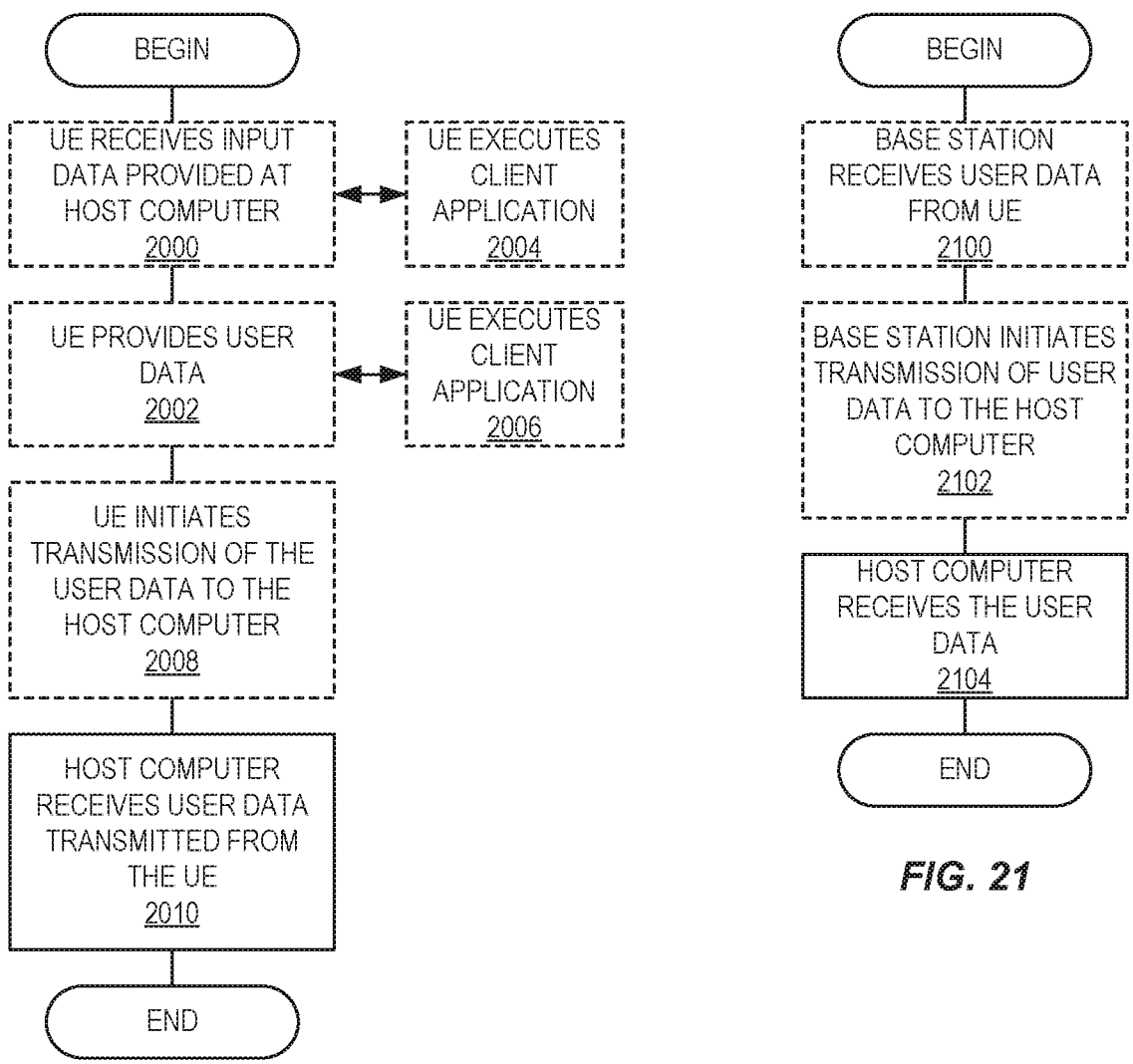

METHODS AND DEVICES FOR REDUCING UE ENERGY CONSUMPTION

RELATED APPLICATIONS

This application is a 35 U.S.C. § 371 national phase filing of International Application No. PCT/SE2021/050118, filed Feb. 12, 2021, which claims the benefit of provisional patent application Ser. No. 62/976,736, filed Feb. 14, 2020, the disclosures of which are hereby incorporated herein by reference in their entireties.

TECHNICAL FIELD

The technology of the disclosure relates generally to reducing power consumption in a wireless device.

BACKGROUND

The next paradigm shift in processing and manufacturing is the so-called Industry 4.0 wherein factories are automated and can become more flexible and dynamic due to wireless connectivity. Industry 4.0 may include real-time control of robots and machines using Time-Critical Machine Type Communication (cMTC), as well as improved observability, control, and error detection with the help of large numbers of more simple actuators and sensors (massive Machine-Type Communication or mMTC).

For cMTC support, Ultra-Reliable and Low Latency Communication (URLLC) was introduced in $3^{rd}$ Generation Partnership Project (3GPP) Release 15 for both Long Term Evolution (LTE) and New Radio (NR), and NR URLLC is further enhanced in Release 16 within the enhanced URLLC (eURLLC) and Industrial Internet of Things (IoT) work items.

For mMTC and Low Power Wide Area (LPWA) support, 3GPP introduced both narrowband IoT (NB-IoT) and LTE for machine-type communication (LTE-MTC, or LTE-M) in Release 13. These technologies have been further enhanced through subsequent releases, including the ongoing Release 16.

NR was introduced in 3GPP Release 15 and focused mainly on the enhanced Mobile Broadband (eMBB) and cMTC. For Release 17, however, an NR User Equipment (UE) type with lower capabilities will likely be introduced. The intention is to have an MTC version of NR, for example a mid-end Reduced Capability NR Device (NR-REDCAP), to fill the gap between eMBB NR and NB-IoT/LTE-M to provide more efficient in-band operation with URLLC in industrial use cases, as an example.

Low-cost or low-complexity UE implementation is needed for the 5G system to support massive industrial sensors deployment or wearables, for example. Currently, NR-REDCAP is used as the running name for discussions of such low-complexity UEs in 3GPP (see RP-193238 for more detail). NR-REDCAP is a new feature that is currently under discussion and may be introduced as early as in 3GPP Release 17. NR-REDCAP is intended for use cases that do not require a device to support full-fledged NR capability and IMT-2020 performance requirements. For example, the data rate does not need to reach above 1 Gbps, and the latency does not need to be as low as 1 ms. By relaxing the data rate and latency targets, NR-REDCAP allows low-cost and/or low-complexity UE implementation. In 3GPP Release 15, an NR UE is required to support 100 MHz carrier bandwidth in frequency range 1 (from 410 MHz to 7125 MHz) and 200 MHz carrier bandwidth in frequency range 2 (from 24.25 GHz to 52.6 GHz). For NR-REDCAP UEs, supporting 100 MHz or 200 MHz bandwidth may not be necessary. For example, a UE bandwidth of 8.64 MHz might be sufficient if a particular use case does not require a data rate higher than 20 Mbps. Reduced UE bandwidth may result in complexity reduction and possibly energy consumption reduction as well.

In 3GPP Rel-17, support for 'Small Data Enhancements' is also being introduced for NR (See RP-192572 for more detail). In this regard, solutions such as 2-step Random Access Channel (RACH) solution with data in MsgA, 4-step RACH based solution (INACTIVE Early Data Transmission), Preconfigured Uplink Resources, and so on may be considered. The expected gain from signaling reduction may be related to reduced UE power consumption (and hence longer battery life) in a UE and reduced signaling overhead and capacity improvement in a network.

Further, the 3GPP Rel-17 Study Item RP-193238 on 'Support of Reduced Capability NR Devices' includes the following objective:

Study UE power saving and battery lifetime enhancement for reduced capability UEs in applicable use cases (e.g., delay tolerant) [RAN2, RAN1]:
Reduced Physical Downlink Control Channel (PDCCH) monitoring by smaller numbers of Blind Decodes (BD) and Control Channel Element (CCE) limits [RAN1].

SUMMARY

Embodiments disclosed herein include a method for reducing energy consumption in a wireless device. A wireless device (e.g., a user equipment) can provide an indication to a network node (e.g., a base station) to indicate that the wireless device will prioritize energy consumption reduction over some network requirements (e.g., latency and/or scheduling flexibility requirements). Accordingly, the wireless device can perform certain power-saving actions to reduce energy consumption. The network node, upon receiving the indication from the wireless device, can perform certain network-related actions to assist the wireless device in reducing energy consumption. As a result, it is possible for the wireless device to reduce energy consumption and complexity, thus helping to prolong battery life in the wireless device.

In one embodiment, a method performed by a wireless device for reducing energy consumption in the wireless device is provided. The method includes providing an indication to a network node to indicate that the wireless device will prioritize energy consumption reduction over one or more other network requirements. The method also includes performing one or more power-saving actions to reduce energy consumption in the wireless device after providing the indications to the network node.

In another embodiment, providing the indication to the network node comprises providing the indication explicitly as one or more of the following: (a) a power-saving indication provided to the network node during a random-access procedure; and (b) an indication provided to the network node during certain services initiated by the wireless device.

In another embodiment, providing the indication to the network node comprises providing the indication implicitly as one or more of the following: (a) an indication derived from one or more of: a delay tolerant indication, a small data indication, a New Radio Reduced Capability (NR-REDCAP), User Equipment (UE) capability indication, a service type indication, a Quality of Service (QoS) configuration or network slice information, an indication for a specific Physical Downlink Control Channel (PDCCH) monitoring capability, and a power-preference indicator; and (b) an indication configured to provide further information regarding an expected type of traffic or allowed requirements.

In another embodiment, performing the one or more power-saving actions comprises one or more of: (a) reducing PDCCH monitoring and/or PDCCH bandwidth of the wireless device; and (b) reducing on-time of the wireless device.

In another embodiment, performing the one or more power-saving actions further comprises performing one or more of the following: (a) applying a Discontinuous Reception (DRX) cycle during a Random Access (RA) window, a contention window, a 2-step Random Access Channel (RACH) MsgB-receptionWindow, a Preconfigured Uplink Resources (PUR) configured grant search space window, or a Hybrid Automatic Repeat Request (HARQ) Round Trip Time (RTT) timer duration; (b) employing a different ra-ResponseWindow or a different ra-ContentionWindow from a default configuration; (c) decoding a lesser number of Random Access Responses (RARs); (d) reducing bandwidth of PDCCH from a PDCCH configured for normal operations; (e) not monitoring PDCCH for a configurable amount of time; (f) monitoring PDCCH for a shortened duration; (g) limiting a number of Control Resource Sets (CORESETs) monitored by the wireless device or configuring a narrower bandwidth for the CORESETs; (h) limiting a number of secondary carriers or supplementary uplinks considered by the wireless device; and (i) performing a reduced number of Blind Decodings (BD) and/or channel estimation.

In another embodiment, the one or more other network requirements comprise at least one of a latency requirement and a scheduling flexibility requirement.

In another embodiment, a wireless device is provided. The wireless device includes processing circuitry and transceiver circuitry. The processing circuitry and the transceiver circuitry are configured to cause the wireless device to provide an indication to a network node to indicate that the wireless device will prioritize energy consumption reduction over one or more other network requirements. The processing circuitry and the transceiver circuitry are configured to cause the wireless device to perform one or more power-saving actions to reduce energy consumption in the wireless device after providing the indication to the network node. The wireless device also includes power supply circuitry configured to supply power to the wireless device.

In another embodiment, the processing circuitry and the transceiver circuitry are configured to cause the wireless device to perform any of the steps performed by the wireless device.

In another embodiment, a method performed by a network node for reducing energy consumption in a wireless device is provided. The method includes receiving an indication from a wireless device that indicates that the wireless device will prioritize energy consumption reduction over one or more other network requirements. The method also includes performing one or more network-related actions to assist the wireless device to reduce energy consumption in response to receiving the indication from the wireless device.

In another embodiment, receiving the indication from the wireless device comprises receiving the indication explicitly as one or more of the following: (a) a power-saving indication provided to the network node during a random-access procedure of the wireless device; and (b) an indication provided to the network node during certain services initiated by the wireless device.

In another embodiment, receiving the indication from the wireless device comprises receiving the indication implicitly as one or more of the following: (a) an indication derived from one or more of: a delay tolerant indication, a small data indication, a NR-REDCAP, a UE capability indication, a service type indication, a QoS configuration or network slice information, an indication for a specific PDCCH monitoring capability, and a power-preference indicator; and (b) an indication configured to provide further information regarding an expected type of traffic or allowed requirements.

In another embodiment, performing the one or more network-related actions comprises performing one or more of: (a) configuring the wireless device to reduce PDCCH monitoring and/or PDCCH bandwidth; and (b) configuring the wireless device to reduce on-time.

In another embodiment, performing the one or more network-related actions comprises performing one or more of the following: (a) not scrambling a Downlink Control Information (DCI) with an identical Random Access Radio Network Temporary Identifier (RA-RNTI); (b) providing a second indication in the DCI to indicate how many Packet Arrival Rates (PARs), will be scheduled next with identical service indication; (c) buffering data destined to the wireless device when the wireless device does not monitor PDCCH for a configurable amount of time; (d) providing the wireless device with a separate Common Search Space (CSS) and/or UE Search Space (USS) sparser configuration with less frequent PDCCH monitoring periodicity; (e) a limiting number of CORESETs the wireless device must monitor or configuring a narrower bandwidth for the CORESETs; and (f) a limiting number of secondary carriers or supplementary uplinks the wireless device needs to consider.

In another embodiment, the one or more other network requirements comprise at least one of a latency requirement and a scheduling flexibility requirement.

In another embodiment, a base station is provided. The base station includes a control system. The control system is configured to cause the base station to receive an indication from a wireless device that indicates that the wireless device will prioritize energy consumption reduction over one or more other network requirements. The control system is configured to cause the base station to perform one or more network-related actions to assist the wireless device to reduce energy consumption in response to receiving the indication from the wireless device.

In another embodiment, the control system is further configured to cause the base station to perform any of the steps performed by the base station.

BRIEF DESCRIPTION OF THE DRAWINGS

The accompanying drawing figures incorporated in and forming a part of this specification illustrate several aspects of the disclosure, and together with the description serve to explain the principles of the disclosure.

FIG. 18 is a flowchart illustrating a method implemented in a communication system, in accordance with one embodiment;

FIG. 19 is a flowchart illustrating a method implemented in a communication system, in accordance with one embodiment;

FIG. 20 is a flowchart illustrating a method implemented in a communication system, in accordance with one embodiment; and FIG. 21 is a flowchart illustrating a method implemented in a communication system, in accordance with one embodiment.

DETAILED DESCRIPTION

Figure 1:
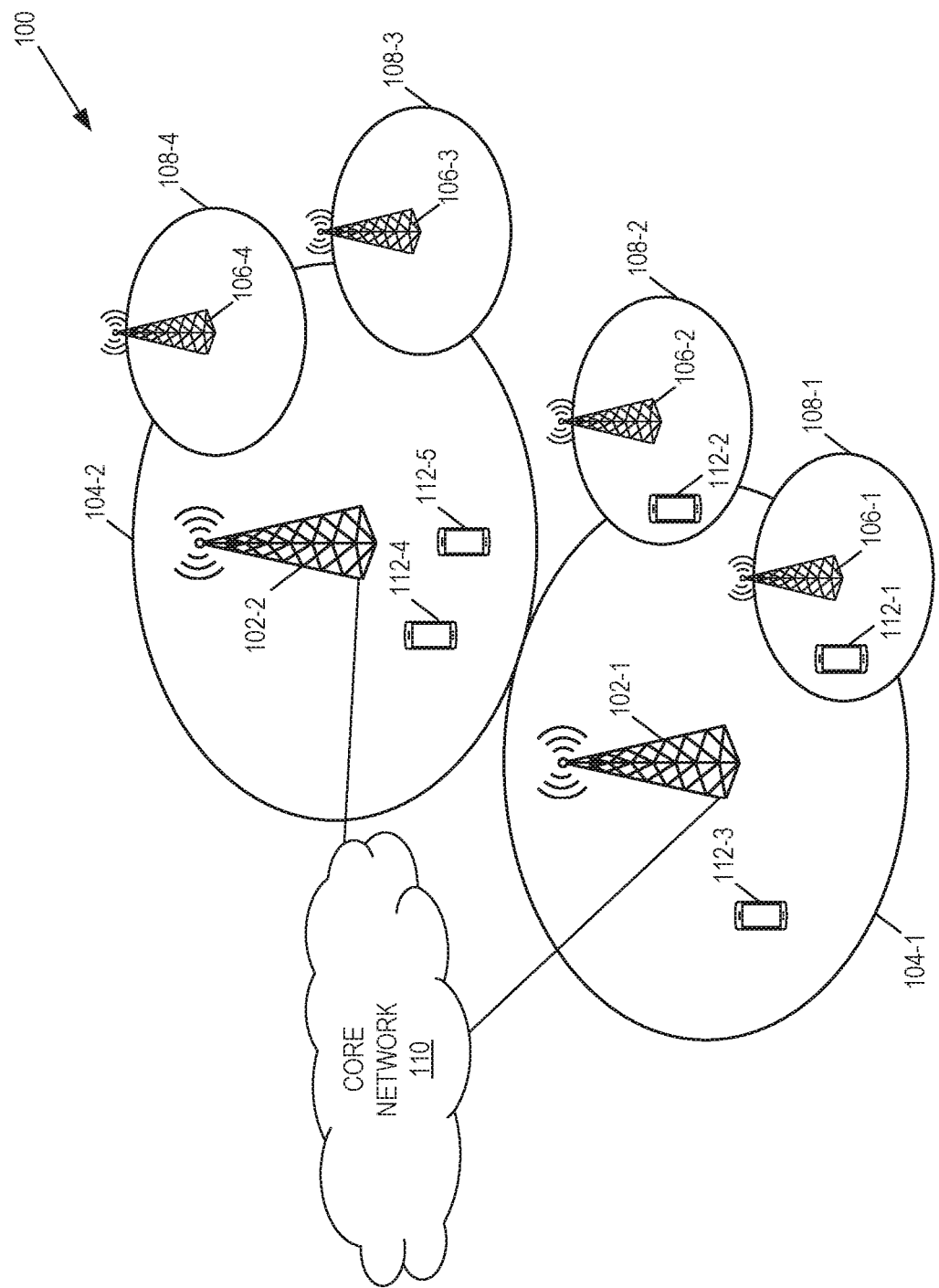
FIG. 1 illustrates one example of a cellular communications system in which embodiments of the present disclosure may be implemented.

The embodiments set forth below represent information to enable those skilled in the art to practice the embodiments and illustrate the best mode of practicing the embodiments. Upon reading the following description in light of the accompanying drawing figures, those skilled in the art will understand the concepts of the disclosure and will recognize applications of these concepts not particularly addressed herein. It should be understood that these concepts and applications fall within the scope of the disclosure.

Radio Node: As used herein, a "radio node" is either a radio access node or a wireless communication device.

Radio Access Node: As used herein, a "radio access node" or "radio network node" or "radio access network node" is any node in a Radio Access Network (RAN) of a cellular communications network that operates to wirelessly transmit and/or receive signals. Some examples of a radio access node include, but are not limited to, a base station (e.g., a New Radio (NR) base station (gNB) in a Third Generation Partnership Project (3GPP) Fifth Generation (5G) NR network or an enhanced or evolved Node B (eNB) in a 3GPP Long Term Evolution (LTE) network), a high-power or macro base station, a low-power base station (e.g., a micro base station, a pico base station, a home eNB, or the like), a relay node, a network node that implements part of the functionality of a base station (e.g., a network node that implements a gNB Central Unit (gNB-CU) or a network node that implements a gNB Distributed Unit (gNB-DU)) or a network node that implements part of the functionality of some other type of radio access node.

Core Network Node: As used herein, a "core network node" is any type of node in a core network or any node that implements a core network function. Some examples of a core network node include, e.g., a Mobility Management Entity (MME), a Packet Data Network Gateway (P-GW), a Service Capability Exposure Function (SCEF), a Home Subscriber Server (HSS), or the like. Some other examples of a core network node include a node implementing a Access and Mobility Function (AMF), a UPF, a Session Management Function (SMF), an Authentication Server Function (AUSF), a Network Slice Selection Function (NSSF), a Network Exposure Function (NEF), a Network Function (NF) Repository Function (NRF), a Policy Control Function (PCF), a Unified Data Management (UDM), or the like.

Communication Device: As used herein, a "communication device" is any type of device that has access to an access network. Some examples of a communication device include, but are not limited to: mobile phone, smart phone, sensor device, meter, vehicle, household appliance, medical appliance, media player, camera, or any type of consumer electronic, for instance, but not limited to, a television, radio, lighting arrangement, tablet computer, laptop, or Personal Computer (PC). The communication device may be a portable, hand-held, computer-comprised, or vehicle-mounted mobile device, enabled to communicate voice and/or data via a wireless or wireline connection.

Wireless Communication Device: One type of communication device is a wireless communication device, which may be any type of wireless device that has access to (i.e., is served by) a wireless network (e.g., a cellular network). Some examples of a wireless communication device include, but are not limited to: a User Equipment device (UE) in a 3GPP network, a Machine Type Communication (MTC) device, and an Internet of Things (IoT) device. Such wireless communication devices may be, or may be integrated into, a mobile phone, smart phone, sensor device, meter, vehicle, household appliance, medical appliance, media player, camera, or any type of consumer electronic, for instance, but not limited to, a television, radio, lighting arrangement, tablet computer, laptop, or PC. The wireless communication device may be a portable, hand-held, computer-comprised, or vehicle-mounted mobile device, enabled to communicate voice and/or data via a wireless connection.

Network Node: As used herein, a "network node" is any node that is either part of the radio access network or the core network of a cellular communications network/system.

Note that the description given herein focuses on a 3GPP cellular communications system and, as such, 3GPP terminology or terminology similar to 3GPP terminology is oftentimes used. However, the concepts disclosed herein are not limited to a 3GPP system.

Note that, in the description herein, reference may be made to the term "cell"; however, particularly with respect to 5G NR concepts, beams may be used instead of cells and, as such, it is important to note that the concepts described herein are equally applicable to both cells and beams.

There currently exist certain challenge(s). The problem is that the current signaling reduction efforts focus only on transmissions of a smaller number of messages (e.g., 2-step Random Access Channel (RACH) procedure, Early Data Transmission (EDT), and Preconfigured Uplink Resources (PUR)), but have largely ignored Physical Downlink Control Channel (PDCCH) monitoring that may consume more energy in a UE than message transmissions. Also, it is unclear how power saving should be achieved for the reduced capability NR devices.

Certain aspects of the present disclosure and their embodiments may provide solutions to the aforementioned or other challenges. Embodiments disclosed herein are related to a method(s) for reducing UE on-time and PDCCH monitoring independent of signaling reductions. In addition, the method(s) further includes signaling to help a gNB determine when to enable UE on-time and PDCCH monitoring reduction.

There are, proposed herein, various embodiments which address one or more of the issues disclosed herein. Embodiments disclosed herein are related to methods for reducing energy consumption in a UE (e.g., a wireless device). More specifically, the methods may need to be supported by both the UE and a network (e.g., a base station).

In one aspect, a method performed by a wireless device for reducing energy consumption in the wireless device is provided. The method includes providing an indication to a network node to indicate that the wireless device will prioritize energy consumption reduction over one or more other network requirements. The method also includes performing one or more power-saving actions to reduce energy consumption in the wireless device after providing the indications to the network node.

In one aspect, a method performed by a network node for reducing energy consumption in a wireless device is provided. The method includes receiving an indication from a wireless device that indicates that the wireless device will prioritize energy consumption reduction over one or more other network requirements. The method also includes performing one or more network-related actions to assist the wireless device to reduce energy consumption in response to receiving the indication from the wireless device.

In one aspect, a method performed by a wireless device for reducing energy consumption in the wireless device is provided. The method includes providing an indication(s) to a network (e.g., a base station). The indication(s) may be an explicit indication(s) or an implicit indication(s) that the wireless device (e.g., a UE) will prioritize energy consumption reduction over other network requirements (e.g., latency and/or scheduling flexibility). The method also includes performing one or more power-saving actions to reduce energy consumption in the wireless device after providing the indication(s) to the network.

In another aspect, a method performed by a base station for reducing energy consumption in a wireless device is provided. The method includes receiving an indication(s) from a wireless device (e.g., a UE) that explicitly or implicitly indicates that the wireless device will prioritize energy consumption reduction over other network requirements (e.g., latency and/or scheduling flexibility). The method also includes performing one or more network-related actions to assist the wireless device to reduce energy consumption in response to receiving the indication(s) from the wireless device.

Certain embodiments may provide one or more of the following technical advantage(s), including reduced UE energy consumption, longer battery life, and reduced UE complexity.

FIG. 1 illustrates one example of a cellular communications system 100 in which embodiments of the present disclosure may be implemented. In the embodiments described herein, the cellular communications system 100 is a 5G system (5GS) including a NR RAN. In this example, the RAN includes base stations 102-1 and 102-2, which are referred to as gNBs (e.g., LTE RAN nodes connected to 5GC, which are referred to as gn-eNBs), controlling corresponding (macro) cells 104-1 and 104-2. The base stations 102-1 and 102-2 are generally referred to herein collectively as base stations 102 and individually as base station 102. Likewise, the (macro) cells 104-1 and 104-2 are generally referred to herein collectively as (macro) cells 104 and individually as (macro) cell 104. The RAN may also include a number of low power nodes 106-1 through 106-4 controlling corresponding small cells 108-1 through 108-4. The low power nodes 106-1 through 106-4 can be small base stations (such as pico or femto base stations) or Remote Radio Heads (RRHs), or the like. Notably, while not illustrated, one or more of the small cells 108-1 through 108-4 may alternatively be provided by the base stations 102. The low power nodes 106-1 through 106-4 are generally referred to herein collectively as low power nodes 106 and individually as low power node 106. Likewise, the small cells 108-1 through 108-4 are generally referred to herein collectively as small cells 108 and individually as small cell 108. The cellular communications system 100 also includes a core network 110, which in the 5GS is referred to as the 5G core (5GC). The base stations 102 (and optionally the low power nodes 106) are connected to the core network 110.

The base stations 102 and the low power nodes 106 provide service to wireless communication devices 112-1 through 112-5 in the corresponding cells 104 and 108. The wireless communication devices 112-1 through 112-5 are generally referred to herein collectively as wireless communication devices 112 and individually as wireless communication device 112. In the following description, the wireless communication devices 112 are oftentimes UEs, but the present disclosure is not limited thereto.

UE battery life is primarily determined by actions performed by UEs (e.g., UEs 112) in such states that do not permit the UEs to conserve power (e.g., transmission and reception). A reference list of power consumption in different states can be found in Table 1 below.

TABLE 1

| Reference UE power consumption per state | |
|---|---|
| UE State | Power Consumption |
| Deep Sleep | 15 µW |
| Light Sleep | 3 mW |
| Transmission | 500 mW |
| Reception | 80 mW |

Signaling reduction techniques typically focus on reducing numbers of signaling and/or energy consumption related to message transmission, for example, Data over Non-Access Stratum (DoNAS), EDT, 2-step RACH, PUR, etc. However, as can be seen from the power consumption numbers in Table 1, if a UE needs to monitor a downlink control channel (e.g., PDCCH) for a duration that is seven (7) times longer than a duration the UE takes to transmit a message, the UE may end up consuming more energy than it would for message transmission (P_TX (500 mW)<7× P_RX (80 mW)=560 mW). Since 3GPP technology requires the UE to monitor PDCCH for scheduling flexibility of any uplink or downlink transmissions, the UE can consume a significant amount of power during UE reception without data transmission.

The UE may monitor PDCCH according to either a Common Search Space (CSS) and/or a UE-specific Search Space (USS) configuration. The configuration will indicate in which slots and which symbols the UE needs to monitor PDCCH. The Medium Access Control (MAC) specification defines timers and procedures to indicate when the UE needs to monitor the search spaces, for example, during the 'Random Access Window' after Msg1 transmission in 4-step RACH, during the MsgB window after MsgA transmission in 2-step RACH, during the 'PUR Search Space Window' for PUR, and as determined by Hybrid Automatic Repeat Request (HARQ) and inactivity timers for HARQ operation.

Figure 2:
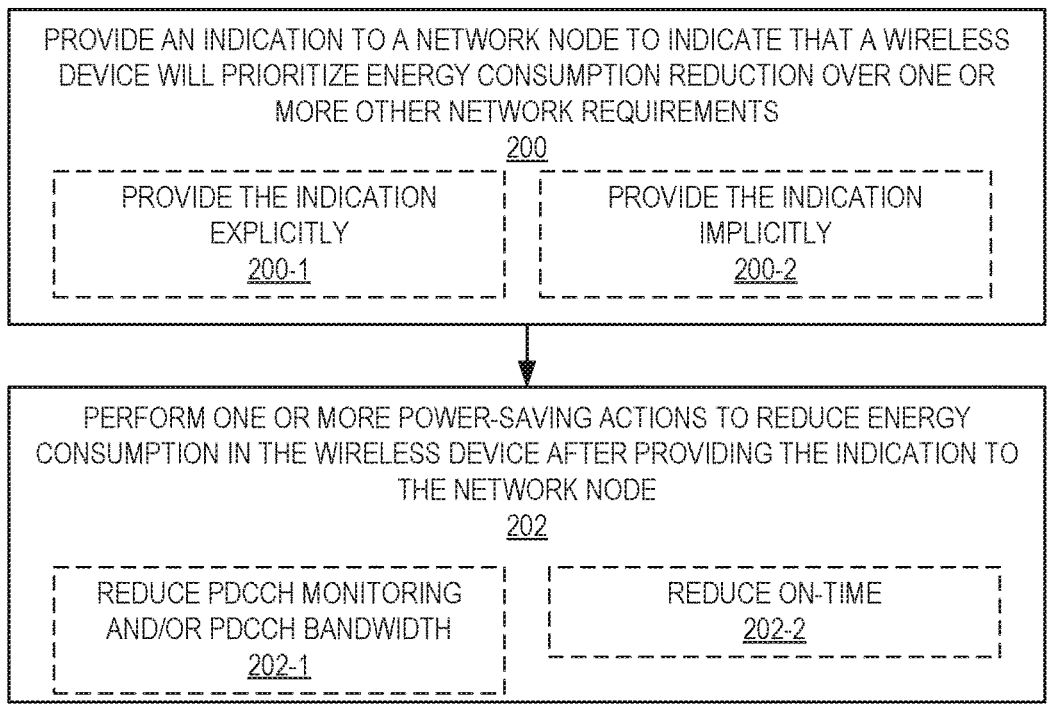
FIG. 2 is a flowchart of an exemplary method performed by a wireless device for reducing energy consumption in the wireless device.

Under some circumstances and use cases, UE energy consumption reduction may be more important than latency and/or scheduling flexibility. In this regard, FIG. 2 is a flowchart of an exemplary method performed by a wireless device for reducing energy consumption in the wireless device. The wireless device is configured to provide an indication to a network node to indicate that the wireless device will prioritize energy consumption reduction over one or more other network requirements (step 200). Notably, the wireless device may provide the indication to the network node explicitly (step 200-1) or implicitly (200-2). Specific examples of explicit and implicit indications will be further discussed below. Accordingly, the wireless device can perform one or more power-saving actions to reduce energy consumption in the wireless device after providing the indication to the network node (step 202). In a non-limiting example, the wireless device can reduce PDCCH monitoring and/or PDCCH bandwidth of the wireless device (step 202-1) and/or reduce on-time (202-2). Additional examples of the actions that may be performed by the wireless device to reduce energy consumption can be found below in this disclosure.

Figure 3:
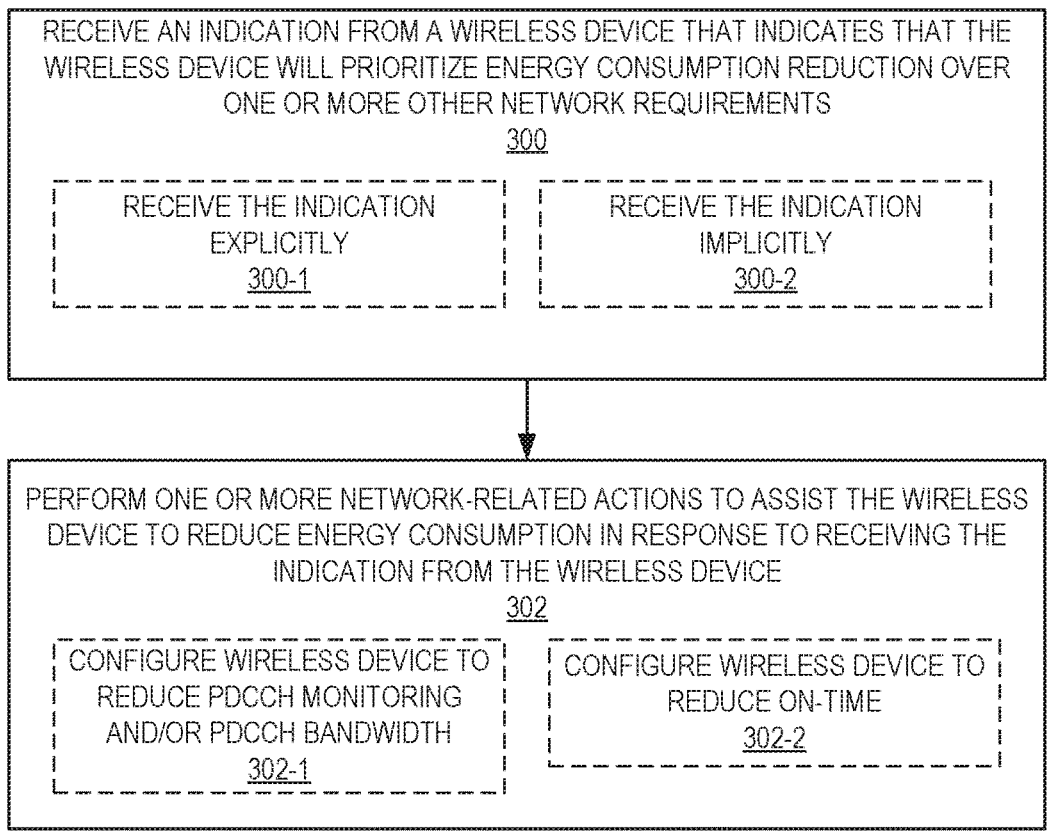
FIG. 3 is a flowchart of an exemplary method that may be employed by the network node to assist the wireless device in FIG. 2 to reduce energy consumption.

FIG. 3 is a flowchart of an exemplary method performed by a network node for reducing energy consumption in a wireless device. The network node is configured to receive an indication from a wireless device that indicates that the wireless device will prioritize energy consumption reduction over one or more other network requirements (step 300). Specifically, the network node may receive the indication explicitly (step 300-1) or implicitly (step 300-2). In a non-limiting example, the network node can configure the wireless device to reduce PDCCH monitoring and/or PDCCH bandwidth (step 302-1) and/or reduce on-time (302-2). Accordingly, the network node can perform one or more network-related actions to assist the wireless device to reduce energy consumption in response to receiving the indication from the wireless device (step 302).

Figure 4:
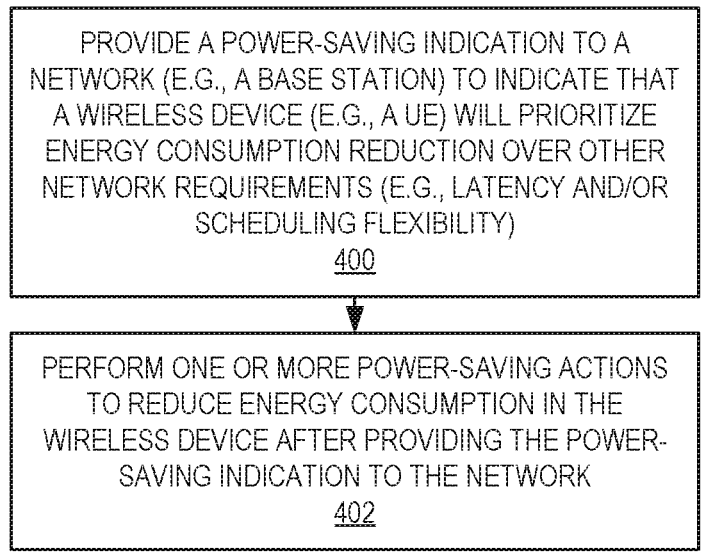
FIG. 4 is a flowchart that illustrates the operation of a User Equipment (UE) according to embodiments of the present disclosure.

FIG. 4 is a flow chart that illustrates the operation of a UE (e.g., a wireless communication device 112). In embodiments disclosed herein, the UE provides an indication to a network node (e.g., a base station), where the indication indicates that the UE needs to prioritize energy consumption reduction over latency and/or scheduling flexibility (step 400). The UE may then take appropriate action(s) to reduce UE PDCCH monitoring and/or on-time (e.g., reception state in Table 1) (step 402). In a non-limiting example, the UE can take one or more of the following actions to reduce the UE PDCCH monitoring:

(e.g., step 202-1) Monitor a smaller number of PDCCH monitoring occasions than the UE would normally monitor, for example, when the UE uses legacy procedures (4-step RACH) to access the network (e.g., step 202-1) Reduce bandwidth of PDCCH from the PDCCH configured for normal operations, for example (e.g., step 202-1) Reduce a number of possibilities in terms of PDCCH configurations that the UE has to check. For example, the UE may perform a smaller number of PDCCH blind decoding attempts than the UE would normally perform (e.g., in connected mode), monitor a smaller number of different Downlink Control Information (DCI) sizes, monitor (or be expected to monitor) a smaller number of non-overlapped Control Channel Element (CCEs) in corresponding PDCCH candidates, and/or monitor a smaller number of PDCCH candidates for each aggregation level (e.g., smaller than the number required to monitor in Type0/0A/2-PDCCH CSS sets or CSS sets configured by searchSpaceSIB1).

In a non-limiting example, based on a study in 3GPP TS 38.840, it is possible to reduce the PDCCH power consumption by about 15% by reducing the number of Blind Decodings (BD) by half. The PDCCH power consumption reduction can be generalized as $[30(1-\alpha)]\%$, wherein $\alpha$ represents the ratio of number of BD over the maximum BD limit. Hence, without any BD, UE can save PDCCH power consumption by 30%, with the remaining 70% consumed by PDCCH-related power consumption not related to the BD.

The overall power saving by BD reduction depends on the scenario and the contribution of PDCCH monitoring part (e.g., considering time percentage) on the total UE power consumption. For example, when the contribution of PDCCH monitoring on the total UE power consumption is 60%, reducing the number of BD by half can provide 9% power saving gain.

Figure 5:
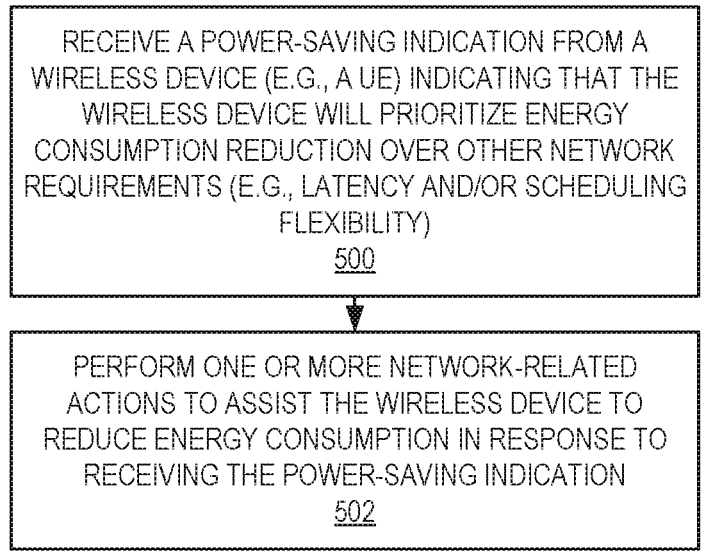
FIG. 5 is a flowchart that illustrates the operation of a base station according to embodiments of the present disclosure.

FIG. 5 is a flowchart of an exemplary method that may be employed by the network node to assist the UE to reduce energy consumption. The method includes receiving an indication(s) from the UE that indicates that the wireless device will prioritize energy consumption reduction over other network requirements (e.g., latency and/or scheduling flexibility) (step 500). The method also includes performing one or more network-related actions to assist the wireless device to reduce energy consumption in response to receiving the indication(s) from the wireless device (step 502).

Indication Definition (e.g., Steps 200, 300, 400, 500)

In general, the UE can send the indication to the network to indicate that the UE needs to prioritize energy consumption reduction over latency and/or scheduling flexibility as early as during the random-access procedure (e.g., using some random-access preambles configured by the network or indicate in Msg3). See, e.g., step 200-1 of FIG. 2.

Furthermore, the UE may also send the indication (e.g., in step 200-1 of FIG. 2) during certain services initialized by the UE. For example, if the UE chooses to use EDT during the random-access procedures, include data in MsgA during 2-step RACH, or using PUR, the network may take appropriate actions to assist the UE to reduce the PDCCH monitoring effort (e.g., step 202-1) and/or UE on-time (e.g., step 202-2). In contrast, if the UE uses a regular configured method (e.g., 4-step RACH procedures in NR) to access the network, it may be seen as an indication that the UE needs to perform a delay-sensitive service request. As such, the network may not prioritize the UE for power saving (e.g., in step 302 of FIG. 3). In this regard, the UE can benefit in terms of energy consumption or latency reduction regardless of the access procedure used. It should be appreciated that the UE may insert the indication in different messages depending on the access procedure. More specifically, the network can either consider an explicit indication to enable a PDCCH monitoring reduction technique (e.g., step 200-1), or it can be implicitly specified in the specification (e.g., step 200-2). For example, if EDT (or some other way to access the system) is used, the UE is expected to monitor a reduced number of PDCCH occasions.

The indication to prioritize energy consumption reduction over latency may also be derived from other indications configured to provide further information regarding the expected type of traffic or allowed requirements in a specific use case (e.g., step 200-2). Such other indications can include but are not limited to:

- 'Delay Tolerant' indication, meaning that the UE allows a delayed delivery of UL and/or DL transmission
- 'Small Data' indication, meaning that a certain message exchange pattern is expected (e.g., EDT or 2-step RACH) and so the gNB can adopt specific PDCCH monitoring patterns. Additional information can be delivered by the 'Release Assistance Indicator' (RAI) or 'Buffer Status Report' (BSR) to express if an application layer reply is expected or not in order to help the gNB release the UE as soon as possible
- NR-REDCAP UE capability, UE type or service type indication, meaning that the gNB can be aware of the UE being a NR-REDCAP UE, of certain specific capabilities, or requesting a specific service which enables the gNB to take specific decisions at an early stage
- Quality-of-service configuration or network slice information (e.g., for the resumed data radio bearer)
- Implicitly by the procedures and/or methods a UE is using to access the network (e.g., EDT, data in message A in 2-step RACH, PUR)
- An indication for a specific PDCCH monitoring capability (e.g., deduced from UE capability signaling regarding its PDCCH monitoring capability)
- 'Power-preference Indicator' (PPI). An indication normally sent in connected mode to specify if the UE wants to be configured with power saving features. The network can take into account previous signaling after the UE is identified, or the indication can be extended to be sent earlier during connection establishment. Alternatively, a different meaning can be assigned to PPI so that by default (if the indication is not sent) the network assumes power saving features should be enabled, and if the indication is sent then the network can disable them (application is not energy sensitive)

Each of these indications can be delivered during Msg1 transmission (e.g., through preamble partitioning), or at Msg3/MsgA transmission either by an explicit indication, or by retrieving the UE context/capabilities through the I-RNTI. Note that the existing indications (such as BSR) will be likely sent only in Msg3/MsgA in order to reduce the impact on the standard.

Methods to Reduce Enemy Consumption (e.g., Steps 202, 302, 402, 502)

Figure 6:
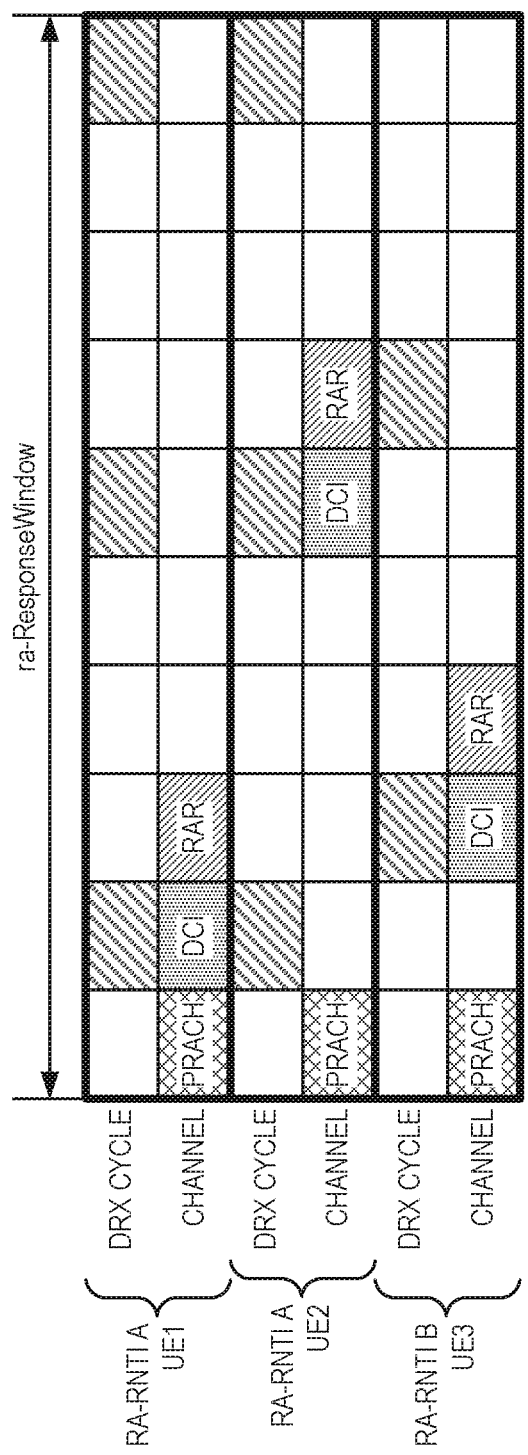
FIG. 6 illustrates an example of Discontinuous Reception (DRX) cycle during a Random Access (RA) window.
Figure 7:
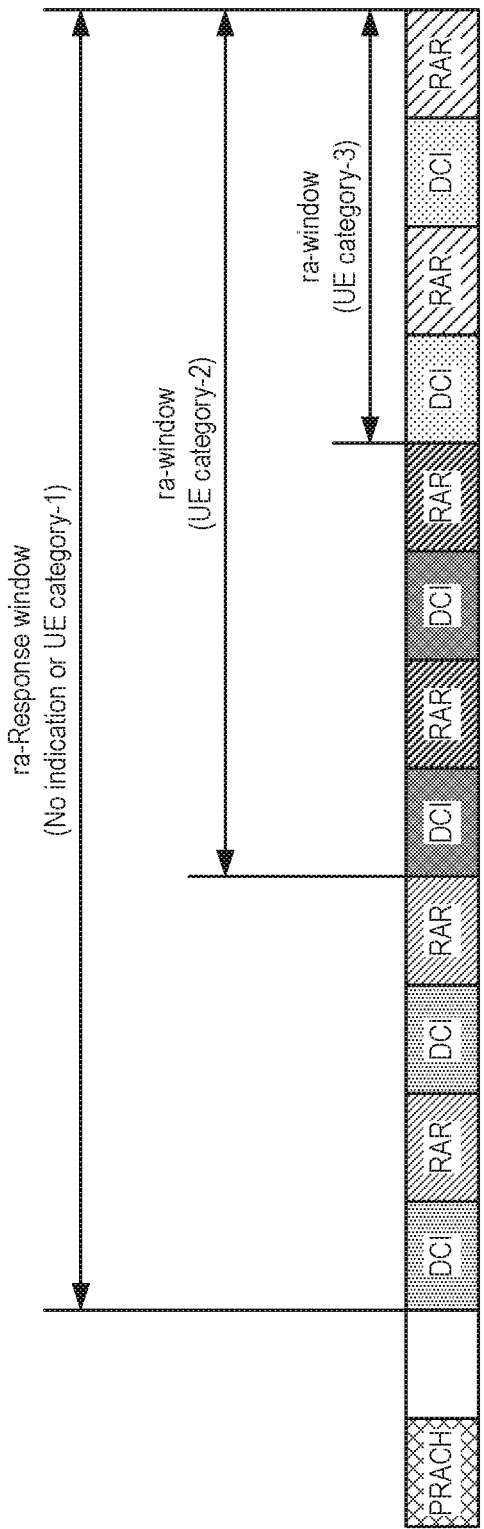
FIG. 7 illustrates examples of different New Radio Reduced Capability (NR-REDCAP) UEs searching for Downlink Control Information (DCI) based on respective categories.

Based on the indications described above, the network and/or the UE may take one or more of the following actions (e.g., in step 202 of FIG. 2 and/or in step 302 of FIG. 3 and/or in step 402 of FIG. 4 and/or in step 502 of FIG. 5) to reduce the UE energy consumption and prolong the UE battery life:

- (e.g., 202-2) A DRX cycle is applied during the 'RA window', the 'Contention Window', the 2-step RACH MsgB-receptionWindow, the PUR 'Configured Grant' Search Space window, or HARQ RTT timer. In this way, the PDCCH occurrences will become sparser and lesser in number if the timers are kept of a constant duration. In a secondary embodiment, the DRX cycle (especially its time offset) is configured based on UE specific information. For instance, the RA-RNTI before Msg3 and TC-RNTI after Msg3. Note that the secondary embodiment may not further improve the energy consumption. Instead, the secondary embodiment may allow the network to distribute the transmission of Msg2s more evenly. An example for the RA window is given in FIG. 6, which illustrates examples of DRX cycle during the RA window. As illustrated in FIG. 6, UE1 and UE2 have the same RA-RNTI and thus use the same DRX cycle. In contrast, UE3 has a different RA-RNTI and thus has a DRX cycle configured with a different offset.
- (e.g., 202-2) Instead of the initial continuous monitoring, the DRX cycle may already be applied immediately upon entering connected mode (either existing short or long DRX, or a new specific DRX for this purpose). For example, the DRX cycle can be applied directly after Msg3 transmission or directly after Msg4 transmission, such that the UE can avoid continuous monitoring of the PDCCH. Notice that this may be achieved in some cases by setting drx-InactivityTimer to 0. Nevertheless, it may be necessary to configure this parameter to some other value (e.g., non-zero) and still have no continuous monitoring in some other cases. Also, a second parameter can be introduced allowing a different configuration of drx-InactivityTimer among legacy and RED-CAP UEs.
- (e.g., 202-2) Based on UE capability or a UE type indication, the NR-REDCAP UE can consider a ra-ResponseWindow or ra-ContentionWindow different from the legacy one in terms of length and offset (e.g., it could start later allowing gNB to schedule critical traffic soon after PRACH transmission and delay tolerant traffic later). In this regard, FIG. 7 illustrates an example where different NR-REDCAP UE based on the category start searching for DCI at different times.
- (e.g., 202-2) The UE sends a UE capability or a UE type indication in Msg1, and the gNB duplicates the same indication (service) in the DCI that schedules the UE Msg2 through a new DCI format. Normally, all the UEs that have sent a preamble in a given PRACH occasion, share the same RA-RNTI. Then, the gNB will schedule the UEs' RAR using a DCI scrambled with the same RA-RNTI. If gNB schedules the UEs' RARs in different messages, each UE will attempt decoding each DCI and then they will attempt decoding each RAR even if the RAR does not contain information for that specific UE. On the other hand, if the DCI was not scrambled with the same RA-RNTI, the UE will avoid decoding the corresponding RAR transmission. By introducing this method, even if the DCI is scrambled with the right RA-RNTI, the UE will avoid decoding the following RAR if the indication does not correspond with the one sent by that UE in Msg1, resulting in less energy consumed.

Figure 8:
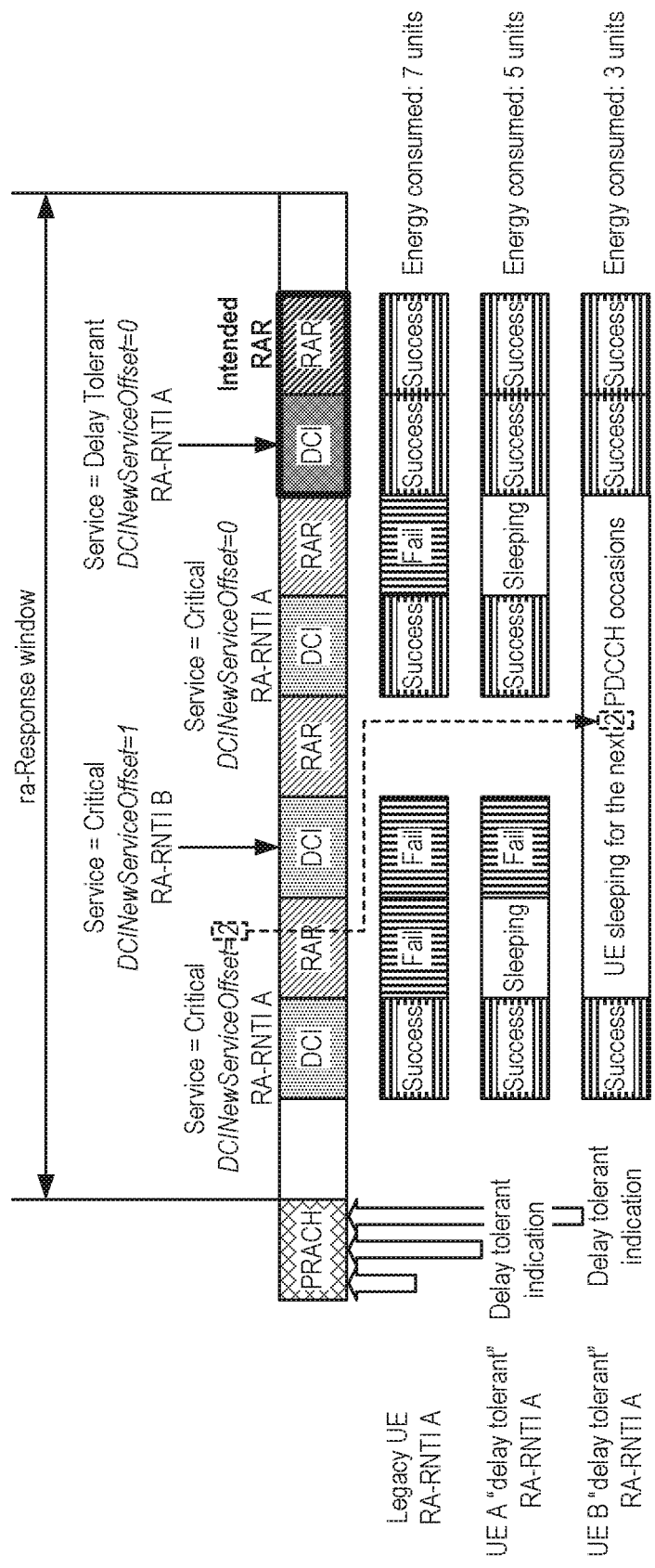
FIG. 8 illustrates an example where a gNB schedules Packet Arrival Rate (PAR) transmissions according to certain traffic and service type.

In a secondary embodiment (e.g., 202-2), a second indication is added to the DCI format (DCIPeriodicityOffset) indicating how many RARs will be scheduled after the current one with the same "service" indication. In this way, a UE can avoid decoding the following PDCCH and RARs. FIG. 8 illustrates an example where gNB schedules RAR transmissions according to a certain traffic and service type (not shown), Legacy UE is not able to read the new indications in DCI and so act as usual trying to decode each DCI and the RAR if the DCI was scrambled with the right RA-RNTI (RA-RNTI A), UE A is able to decode only the "service" indication, and so UE A avoids decoding the RAR if it does not match, and finally UE B is able to decode the DCINewServiceOffset indication too and so UE B avoids any reception of DCIs and RARs that belongs to a wrong service type. The last DCI and RAR in FIG. 8 is the one intended for the UE. This can be extended also for messages other than Msg2. Notice that the second embodiment restricts the scheduling flexibility at the gNB side, meaning that the gNB has to take scheduling decisions in advance to signal the appropriate DCINewServiceOffset in each DCI. Notice also that the first embodiment shows gains only in a congested scenario, where the gNB can organize RARs belonging to different service types in different transmissions.

Figure 9:
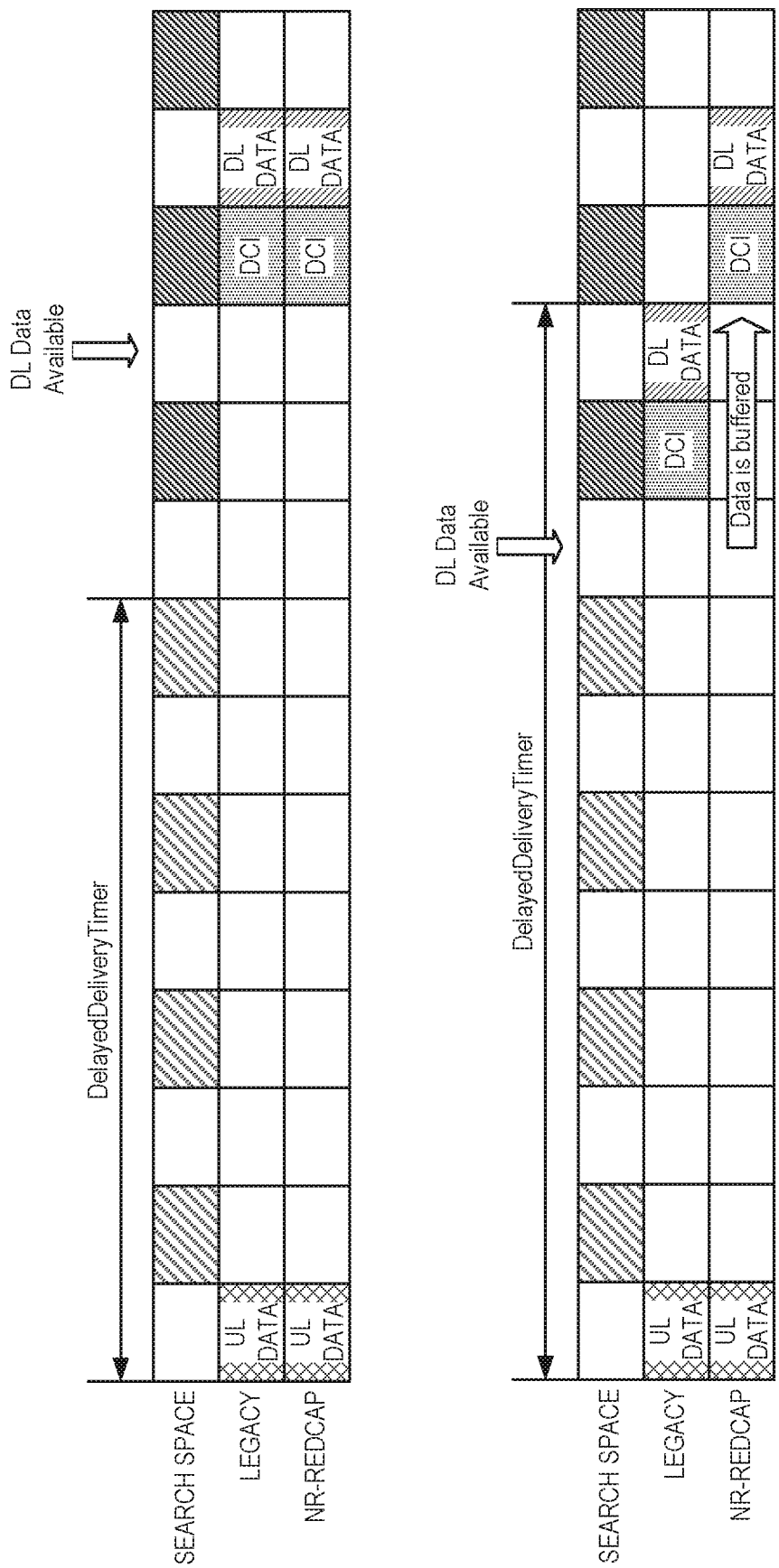
FIG. 9 illustrates an example of a UE not monitored by Physical Downlink Control Channel (PDCCH)

(e.g., 202-1) If DL data delivery is expected to happen with a predictable delay (e.g., in case of application-layer ACK after UL data transmission), the UE does not monitor PDCCH for a configurable amount of time (e.g., DelayedDeliveryTimer). In this way, if the DL data is delivered after a time longer than DelayedDeliveryTimer, the UE saved energy by not monitoring PDCCH and the latency is not affected, if the DL data was ready at gNB before DelayedDeliveryTimer expired, the data is buffered at gNB or in the network until the timer expires with a consequent increased delay, but a certain amount of energy is still saved. The timer can be configured in system information, by RAR or by previous UE-specific RRC configuration. Notice that in some cases DL data can be produced after several seconds from UL data reception, so DelayedDeliverTimer could be configured with a similar value and allowing a considerable energy saving. FIG. 9 provides an example of UE not monitoring PDCCH. Specifically, a top illustration in FIG. 9 provides an example of UE not monitoring PDCCH for a certain timer after UL data transmission in case DL data is ready after the timer expires. A bottom illustration in FIG. 9 provides an example of UE not monitoring PDCCH for a certain timer after UL data transmission in case DL data is ready before the timer expires. In both cases, some energy is saved with respect to legacy case (4 PDCCH occasions) although in the bottom illustration the DL data is delivered slightly later than in the legacy case.

Figure 10:
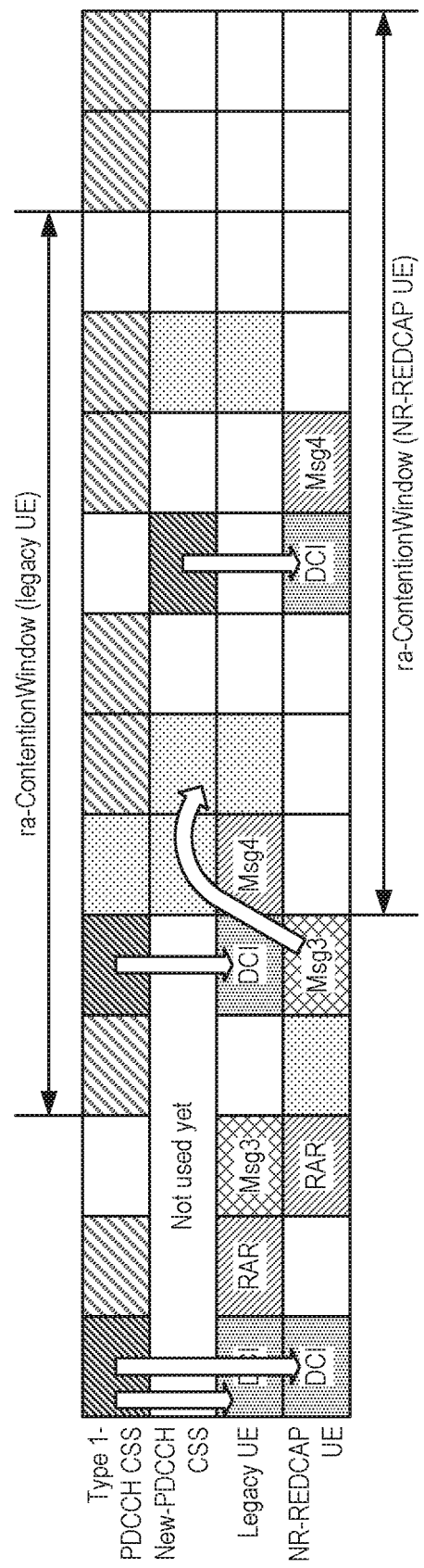
FIG. 10 provides an example where a NR-REDCAP UE uses a new and sparser Common Search Space (CSS) to monitor for Msg4 DCI during the contention window.

(e.g., 202-1) Providing the UE with a separate CSS and/or USS sparser configuration, for example, with less frequent PDCCH monitoring periodicity configured by MonitoringSlotPeriodicityAndOffset, or with a shorter monitoring duration configured by Duration. In addition, the UE may be expected to perform a smaller number of BDs compared to normal operations or to the configured CSS and/or USS for normal operations. FIG. 10 provides an example where a NR-REDCAP UE uses a new and sparser CSS to monitor for Msg4 DCI during the contention window. As shown in FIG. 10, both legacy and NR-REDCAP UE use Type1-PDCCH CSS to receive Msg2 RAR. After Msg3 transmission, NR-REDCAP UE starts using a new, sparser, CSS for Msg4 DCI. In contrast, legacy UE continues to use Type1-PDCCH CSS.

(e.g., 202-1) Limiting the number of CORESETs the UE must monitor or configuring a narrower bandwidth of the CORESET.

(e.g., 202-1) Limiting the number of secondary carriers or supplementary uplinks the UE needs to consider.

(e.g., 202-1) The UE is expected to perform a smaller number of blinds decodes and/or channel estimation over a smaller number of non-overlapped CCEs of monitored PDCCH candidates compared to normal operations.

Figure 11:
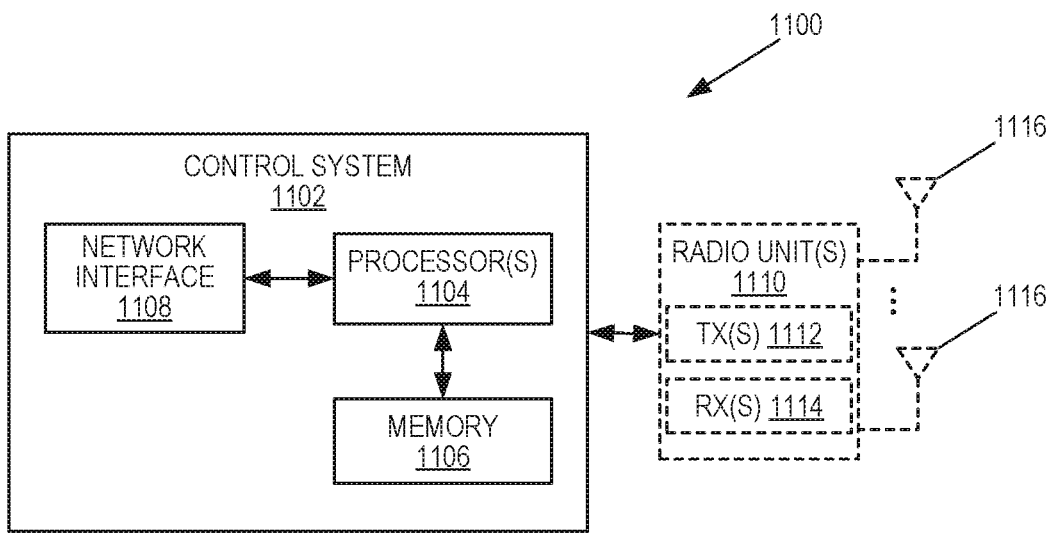
FIG. 11 is a schematic block diagram of a radio access node according to some embodiments of the present disclosure.

FIG. 11 is a schematic block diagram of a radio access node 1100 according to some embodiments of the present disclosure. Optional features are represented by dashed boxes. The radio access node 1100 may be, for example, a base station 102 or 106 or a network node that implements all or part of the functionality of the base station 102 or gNB described herein. As illustrated, the radio access node 1100 includes a control system 1102 that includes one or more processors 1104 (e.g., Central Processing Units (CPUs), Application Specific Integrated Circuits (ASICs), Field Programmable Gate Arrays (FPGAs), and/or the like), memory 1106, and a network interface 1108. The one or more processors 1104 are also referred to herein as processing circuitry. In addition, the radio access node 1100 may include one or more radio units 1110 that each includes one or more transmitters 1112 and one or more receivers 1114 coupled to one or more antennas 1116. The radio units 1110 may be referred to or be part of radio interface circuitry. In some embodiments, the radio unit(s) 1110 is external to the control system 1102 and connected to the control system 1102 via, e.g., a wired connection (e.g., an optical cable). However, in some other embodiments, the radio unit(s) 1110 and potentially the antenna(s) 1116 are integrated together with the control system 1102. The one or more processors 1104 operate to provide one or more functions of a radio access node 1100 as described herein (e.g., one or more functions of a network node as described above, e.g., with respect to FIG. 3). In some embodiments, the function(s) are implemented in software that is stored, e.g., in the memory 1106 and executed by the one or more processors 1104.

Figure 12:
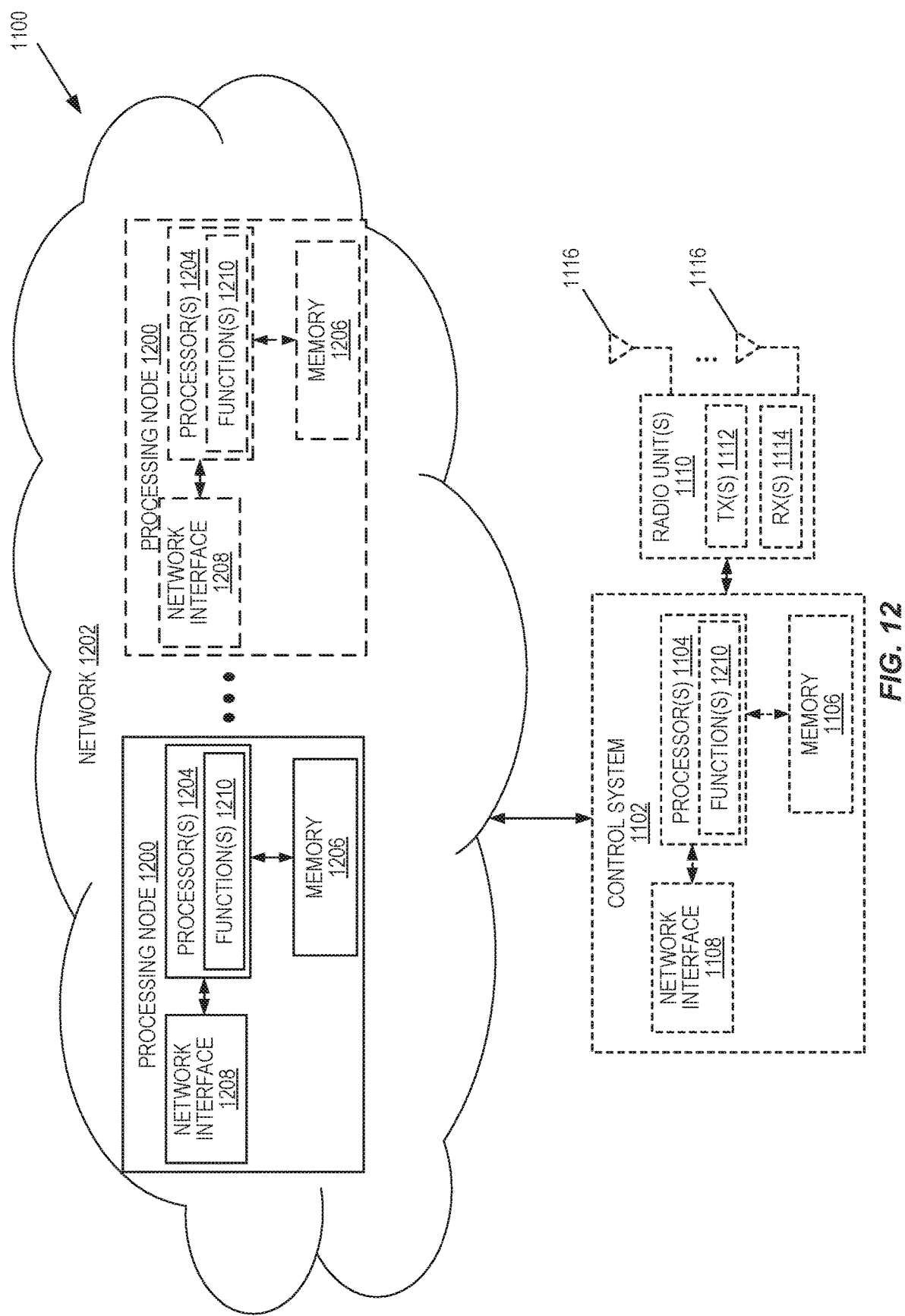
FIG. 12 is a schematic block diagram that illustrates a virtualized embodiment of the radio access node according to some embodiments of the present disclosure.

FIG. 12 is a schematic block diagram that illustrates a virtualized embodiment of the radio access node 1100 according to some embodiments of the present disclosure. This discussion is equally applicable to other types of network nodes. Further, other types of network nodes may have similar virtualized architectures. Again, optional features are represented by dashed boxes.

As used herein, a "virtualized" radio access node is an implementation of the radio access node 1100 in which at least a portion of the functionality of the radio access node 1100 is implemented as a virtual component(s) (e.g., via a virtual machine(s) executing on a physical processing node(s) in a network(s)). As illustrated, in this example, the radio access node 1100 may include the control system 1102 and/or the one or more radio units 1110, as described above. The control system 1102 may be connected to the radio unit(s) 1110 via, for example, an optical cable or the like. The radio access node 1100 includes one or more processing nodes 1200 coupled to or included as part of a network(s) 1202. If present, the control system 1102 or the radio unit(s) are connected to the processing node(s) 1200 via the network 1202. Each processing node 1200 includes one or more processors 1204 (e.g., CPUs, ASICs, FPGAs, and/or the like), memory 1206, and a network interface 1208.

In this example, functions 1210 of the radio access node 1100 described herein (e.g., one or more functions of a network node as described above, e.g., with respect to FIG. 3) are implemented at the one or more processing nodes 1200 or distributed across the one or more processing nodes 1200 and the control system 1102 and/or the radio unit(s) 1110 in any desired manner. In some particular embodiments, some or all of the functions 1210 of the radio access node 1100 described herein are implemented as virtual components executed by one or more virtual machines implemented in a virtual environment(s) hosted by the processing node(s) 1200. As will be appreciated by one of ordinary skill in the art, additional signaling or communication between the processing node(s) 1200 and the control system 1102 is used in order to carry out at least some of the desired functions 1210. Notably, in some embodiments, the control system 1102 may not be included, in which case the radio unit(s) 1110 communicate directly with the processing node(s) 1200 via an appropriate network interface(s).

In some embodiments, a computer program including instructions which, when executed by at least one processor, causes the at least one processor to carry out the functionality of radio access node 1100 or a node (e.g., a processing node 1200) implementing one or more of the functions 1210 of the radio access node 1100 in a virtual environment according to any of the embodiments described herein (e.g., one or more functions of a network node as described above, e.g., with respect of FIG. 3) is provided. In some embodiments, a carrier comprising the aforementioned computer program product is provided. The carrier is one of an electronic signal, an optical signal, a radio signal, or a computer readable storage medium (e.g., a non-transitory computer readable medium such as memory).

Figure 13:
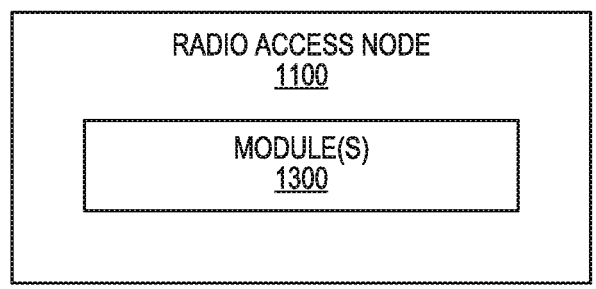
FIG. 13 is a schematic block diagram of the radio access node according to some other embodiments of the present disclosure.

FIG. 13 is a schematic block diagram of the radio access node 1100 according to some other embodiments of the present disclosure. The radio access node 1100 includes one or more modules 1300, each of which is implemented in software. The module(s) 1300 provide the functionality of the radio access node 1100 described herein (e.g., one or more functions of a network node as described above, e.g., with respect to FIG. 3). This discussion is equally applicable to the processing node 1200 of FIG. 12 where the modules 1300 may be implemented at one of the processing nodes 1200 or distributed across multiple processing nodes 1200 and/or distributed across the processing node(s) 1200 and the control system 1102.

Figure 14:
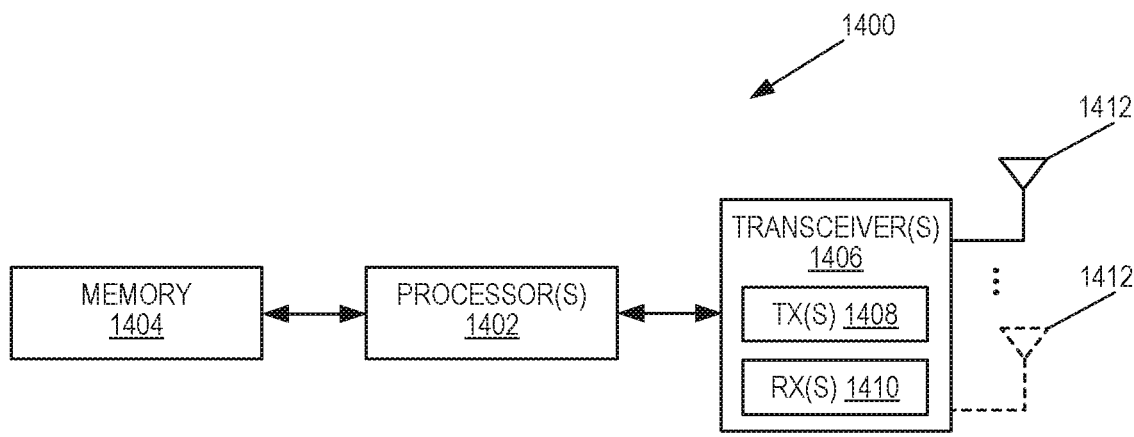
FIG. 14 is a schematic block diagram of a wireless communication device according to some embodiments of the present disclosure.

FIG. 14 is a schematic block diagram of a wireless communication device 1400 according to some embodiments of the present disclosure. As illustrated, the wireless communication device 1400 includes one or more processors 1402 (e.g., CPUs, ASICs, FPGAs, and/or the like), memory 1404, and one or more transceivers 1406 each including one or more transmitters 1408 and one or more receivers 1410 coupled to one or more antennas 1412. The transceiver(s) 1406 includes radio-front end circuitry connected to the antenna(s) 1412 that is configured to condition signals communicated between the antenna(s) 1412 and the processor(s) 1402, as will be appreciated by on of ordinary skill in the art. The processors 1402 are also referred to herein as processing circuitry. The transceivers 1406 are also referred to herein as radio circuitry. In some embodiments, the functionality of the wireless communication device 1400 described above (e.g., one or more functions of a UE as described above, e.g., with respect of FIG. 3) may be fully or partially implemented in software that is, e.g., stored in the memory 1404 and executed by the processor(s) 1402. Note that the wireless communication device 1400 may include additional components not illustrated in FIG. 14 such as, e.g., one or more user interface components (e.g., an input/output interface including a display, buttons, a touch screen, a microphone, a speaker(s), and/or the like and/or any other components for allowing input of information into the wireless communication device 1400 and/or allowing output of information from the wireless communication device 1400), a power supply (e.g., a battery and associated power circuitry), etc.

In some embodiments, a computer program including instructions which, when executed by at least one processor, causes the at least one processor to carry out the functionality of the wireless communication device 1400 according to any of the embodiments described herein (e.g., one or more functions of a UE as described above, e.g., with respect to FIG. 3) is provided. In some embodiments, a carrier comprising the aforementioned computer program product is provided. The carrier is one of an electronic signal, an optical signal, a radio signal, or a computer readable storage medium (e.g., a non-transitory computer readable medium such as memory).

Figure 15:
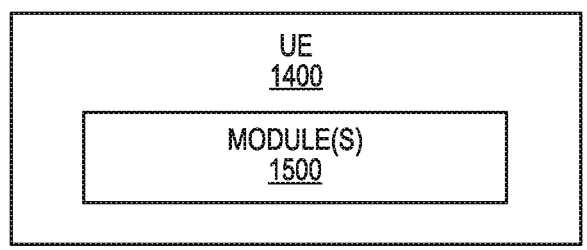
FIG. 15 is a schematic block diagram of the wireless communication device according to some other embodiments of the present disclosure.

FIG. 15 is a schematic block diagram of the wireless communication device 1400 according to some other embodiments of the present disclosure. The wireless communication device 1400 includes one or more modules 1500, each of which is implemented in software. The module(s) 1500 provide the functionality of the wireless communication device 1400 described herein (e.g., one or more functions of a UE as described above, e.g., with respect of FIG. 3).

Figure 16:
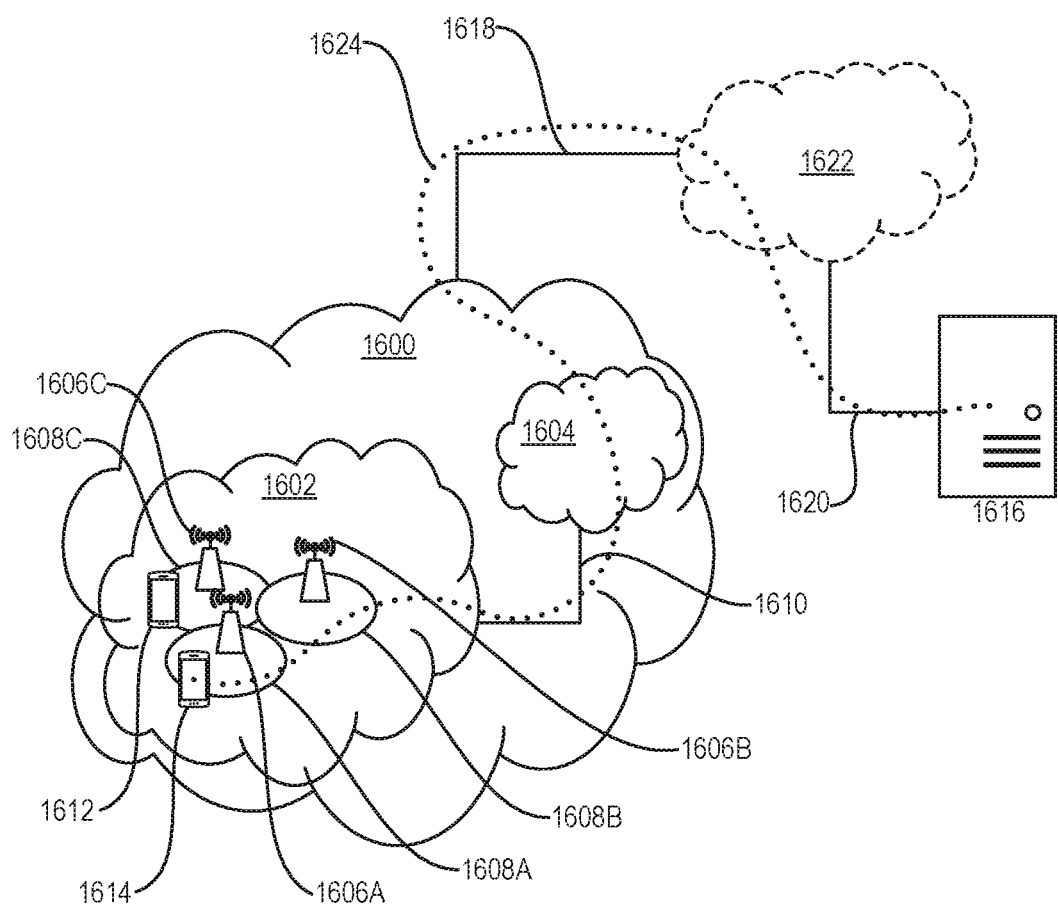
FIG. 16 is a schematic block diagram of a communication system that includes a telecommunication network.

With reference to FIG. 16, in accordance with an embodiment, a communication system includes a telecommunication network 1600, such as a 3GPP-type cellular network, which comprises an access network 1602, such as a RAN, and a core network 1604. The access network 1602 comprises a plurality of base stations 1606A, 1606B, 1606C, such as Node Bs, eNBs, gNBs, or other types of wireless Access Points (APs), each defining a corresponding coverage area 1608A, 1608B, 1608C. Each base station 1606A, 1606B, 1606C is connectable to the core network 1604 over a wired or wireless connection 1610. A first UE 1612 located in coverage area 1608C is configured to wirelessly connect to, or be paged by, the corresponding base station 1606C. A second UE 1614 in coverage area 1608A is wirelessly connectable to the corresponding base station 1606A. While a plurality of UEs 1612, 1614 are illustrated in this example, the disclosed embodiments are equally applicable to a situation where a sole UE is in the coverage area or where a sole UE is connecting to the corresponding base station 1606.

The telecommunication network 1600 is itself connected to a host computer 1616, which may be embodied in the hardware and/or software of a standalone server, a cloud-implemented server, a distributed server, or as processing resources in a server farm. The host computer 1616 may be under the ownership or control of a service provider or may be operated by the service provider or on behalf of the service provider. Connections 1618 and 1620 between the telecommunication network 1600 and the host computer 1616 may extend directly from the core network 1604 to the host computer 1616 or may go via an optional intermediate network 1622. The intermediate network 1622 may be one of, or a combination of more than one of, a public, private, or hosted network; the intermediate network 1622, if any, may be a backbone network or the Internet; in particular, the intermediate network 1622 may comprise two or more sub-networks (not shown).

The communication system of FIG. 16 as a whole enables connectivity between the connected UEs 1612, 1614 and the host computer 1616. The connectivity may be described as an Over-the-Top (OTT) connection 1624. The host computer 1616 and the connected UEs 1612, 1614 are configured to communicate data and/or signaling via the OTT connection 1624, using the access network 1602, the core network 1604, any intermediate network 1622, and possible further infrastructure (not shown) as intermediaries. The OTT connection 1624 may be transparent in the sense that the participating communication devices through which the OTT connection 1624 passes are unaware of routing of uplink and downlink communications. For example, the base station 1606 may not or need not be informed about the past routing of an incoming downlink communication with data originating from the host computer 1616 to be forwarded (e.g., handed over) to a connected UE 1612. Similarly, the base station 1606 need not be aware of the future routing of an outgoing uplink communication originating from the UE 1612 towards the host computer 1616.

Example implementations, in accordance with an embodiment, of the UE, base station, and host computer discussed in the preceding paragraphs will now be described with reference to FIG. 17. In a communication system 1700, a host computer 1702 comprises hardware 1704 including a communication interface 1706 configured to set up and maintain a wired or wireless connection with an interface of a different communication device of the communication system 1700. The host computer 1702 further comprises processing circuitry 1708, which may have storage and/or processing capabilities. In particular, the processing circuitry 1708 may comprise one or more programmable processors, ASICs, FPGAs, or combinations of these (not shown) adapted to execute instructions. The host computer 1702 further comprises software 1710, which is stored in or accessible by the host computer 1702 and executable by the processing circuitry 1708. The software 1710 includes a host application 1712. The host application 1712 may be operable to provide a service to a remote user, such as a UE 1714 connecting via an OTT connection 1716 terminating at the UE 1714 and the host computer 1702. In providing the service to the remote user, the host application 1712 may provide user data which is transmitted using the OTT connection 1716.

The communication system 1700 further includes a base station 1718 provided in a telecommunication system and comprising hardware 1720 enabling it to communicate with the host computer 1702 and with the UE 1714. The hardware 1720 may include a communication interface 1722 for setting up and maintaining a wired or wireless connection with an interface of a different communication device of the communication system 1700, as well as a radio interface 1724 for setting up and maintaining at least a wireless connection 1726 with the UE 1714 located in a coverage area (not shown in FIG. 17) served by the base station 1718. The communication interface 1722 may be configured to facilitate a connection 1728 to the host computer 1702. The connection 1728 may be direct or it may pass through a core network (not shown in FIG. 17) of the telecommunication system and/or through one or more intermediate networks outside the telecommunication system. In the embodiment shown, the hardware 1720 of the base station 1718 further includes processing circuitry 1730, which may comprise one or more programmable processors, ASICs, FPGAs, or combinations of these (not shown) adapted to execute instructions. The base station 1718 further has software 1732 stored internally or accessible via an external connection.

The communication system 1700 further includes the UE 1714 already referred to. The UE's 1714 hardware 1734 may include a radio interface 1736 configured to set up and maintain a wireless connection 1726 with a base station serving a coverage area in which the UE 1714 is currently located. The hardware 1734 of the UE 1714 further includes processing circuitry 1738, which may comprise one or more programmable processors, ASICs, FPGAs, or combinations of these (not shown) adapted to execute instructions. The UE 1714 further comprises software 1740, which is stored in or accessible by the UE 1714 and executable by the processing circuitry 1738. The software 1740 includes a client application 1742. The client application 1742 may be operable to provide a service to a human or non-human user via the UE 1714, with the support of the host computer 1702. In the host computer 1702, the executing host application 1712 may communicate with the executing client application 1742 via the OTT connection 1716 terminating at the UE 1714 and the host computer 1702. In providing the service to the user, the client application 1742 may receive request data from the host application 1712 and provide user data in response to the request data. The OTT connection 1716 may transfer both the request data and the user data. The client application 1742 may interact with the user to generate the user data that it provides.

Figure 17:
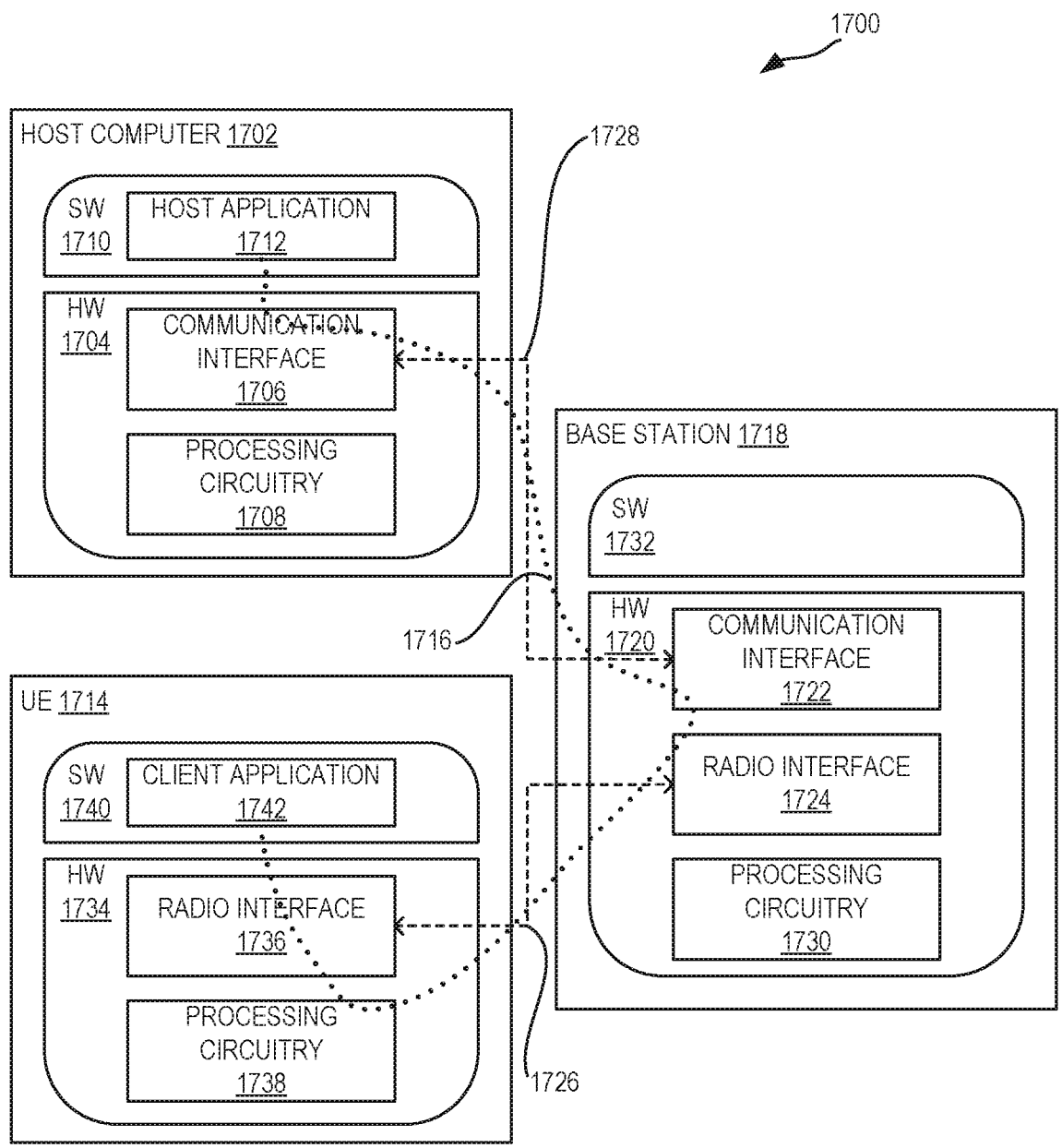
FIG. 17 is a schematic block diagram of a communication system.

It is noted that the host computer 1702, the base station 1718, and the UE 1714 illustrated in FIG. 17 may be similar or identical to the host computer 1616, one of the base stations 1606A, 1606B, 1606C, and one of the UEs 1612, 1614 of FIG. 16, respectively. This is to say, the inner workings of these entities may be as shown in FIG. 17 and independently, the surrounding network topology may be that of FIG. 16.

In FIG. 17, the OTT connection 1716 has been drawn abstractly to illustrate the communication between the host computer 1702 and the UE 1714 via the base station 1718 without explicit reference to any intermediary devices and the precise routing of messages via these devices. The network infrastructure may determine the routing, which may be configured to hide from the UE 1714 or from the service provider operating the host computer 1702, or both. While the OTT connection 1716 is active, the network infrastructure may further take decisions by which it dynamically changes the routing (e.g., on the basis of load balancing consideration or reconfiguration of the network).

The wireless connection 1726 between the UE 1714 and the base station 1718 is in accordance with the teachings of the embodiments described throughout this disclosure. One or more of the various embodiments improve the performance of OTT services provided to the UE 1714 using the OTT connection 1716, in which the wireless connection 1726 forms the last segment. More precisely, the teachings of these embodiments may reduce energy consumption, prolong battery life, and/or reduce complexity of a UE.

A measurement procedure may be provided for the purpose of monitoring data rate, latency, and other factors on which the one or more embodiments improve. There may further be an optional network functionality for reconfiguring the OTT connection 1716 between the host computer 1702 and the UE 1714, in response to variations in the measurement results. The measurement procedure and/or the network functionality for reconfiguring the OTT connection 1716 may be implemented in the software 1710 and the hardware 1704 of the host computer 1702 or in the software 1740 and the hardware 1734 of the UE 1714, or both. In some embodiments, sensors (not shown) may be deployed in or in association with communication devices through which the OTT connection 1716 passes; the sensors may participate in the measurement procedure by supplying values of the monitored quantities exemplified above, or supplying values of other physical quantities from which the software 1710, 1740 may compute or estimate the monitored quantities. The reconfiguring of the OTT connection 1716 may include message format, retransmission settings, preferred routing, etc.; the reconfiguring need not affect the base station 1718, and it may be unknown or imperceptible to the base station 1718. Such procedures and functionalities may be known and practiced in the art. In certain embodiments, measurements may involve proprietary UE signaling facilitating the host computer 1702's measurements of throughput, propagation times, latency, and the like. The measurements may be implemented in that the software 1710 and 1740 causes messages to be transmitted, in particular empty or 'dummy' messages, using the OTT connection 1716 while it monitors propagation times, errors, etc.

FIG. 18 is a flowchart illustrating a method implemented in a communication system, in accordance with one embodiment. The communication system includes a host computer, a base station, and a UE which may be those described with reference to FIGS. 16 and 17. For simplicity of the present disclosure, only drawing references to FIG. 18 will be included in this section. In step 1800, the host computer provides user data. In sub-step 1802 (which may be optional) of step 1800, the host computer provides the user data by executing a host application. In step 1804, the host computer initiates a transmission carrying the user data to the UE. In step 1806 (which may be optional), the base station transmits to the UE the user data which was carried in the transmission that the host computer initiated, in accordance with the teachings of the embodiments described throughout this disclosure. In step 1808 (which may also be optional), the UE executes a client application associated with the host application executed by the host computer.

FIG. 19 is a flowchart illustrating a method implemented in a communication system, in accordance with one embodiment. The communication system includes a host computer, a base station, and a UE which may be those described with reference to FIGS. 16 and 17. For simplicity of the present disclosure, only drawing references to FIG. 19 will be included in this section. In step 1900 of the method, the host computer provides user data. In an optional sub-step (not shown) the host computer provides the user data by executing a host application. In step 1902, the host computer initiates a transmission carrying the user data to the UE. The transmission may pass via the base station, in accordance with the teachings of the embodiments described throughout this disclosure. In step 1904 (which may be optional), the UE receives the user data carried in the transmission.

FIG. 20 is a flowchart illustrating a method implemented in a communication system, in accordance with one embodiment. The communication system includes a host computer, a base station, and a UE which may be those described with reference to FIGS. 16 and 17. For simplicity of the present disclosure, only drawing references to FIG. 20 will be included in this section. In step 2000 (which may be optional), the UE receives input data provided by the host computer. Additionally or alternatively, in step 2002, the UE provides user data. In sub-step 2004 (which may be optional) of step 2000, the UE provides the user data by executing a client application. In sub-step 2006 (which may be optional) of step 2002, the UE executes a client application which provides the user data in reaction to the received input data provided by the host computer. In providing the user data, the executed client application may further consider user input received from the user. Regardless of the specific manner in which the user data was provided, the UE initiates, in sub-step 2008 (which may be optional), transmission of the user data to the host computer. In step 2010 of the method, the host computer receives the user data transmitted from the UE, in accordance with the teachings of the embodiments described throughout this disclosure.

FIG. 21 is a flowchart illustrating a method implemented in a communication system, in accordance with one embodiment. The communication system includes a host computer, a base station, and a UE which may be those described with reference to FIGS. 16 and 17. For simplicity of the present disclosure, only drawing references to FIG. 21 will be included in this section. In step 2100 (which may be optional), in accordance with the teachings of the embodiments described throughout this disclosure, the base station receives user data from the UE. In step 2102 (which may be optional), the base station initiates transmission of the received user data to the host computer. In step 2104 (which may be optional), the host computer receives the user data carried in the transmission initiated by the base station.

Any appropriate steps, methods, features, functions, or benefits disclosed herein may be performed through one or more functional units or modules of one or more virtual apparatuses. Each virtual apparatus may comprise a number of these functional units. These functional units may be implemented via processing circuitry, which may include one or more microprocessor or microcontrollers, as well as other digital hardware, which may include Digital Signal Processor (DSPs), special-purpose digital logic, and the like. The processing circuitry may be configured to execute program code stored in memory, which may include one or several types of memory such as Read Only Memory (ROM), Random Access Memory (RAM), cache memory, flash memory devices, optical storage devices, etc. Program code stored in memory includes program instructions for executing one or more telecommunications and/or data communications protocols as well as instructions for carrying out one or more of the techniques described herein. In some implementations, the processing circuitry may be used to cause the respective functional unit to perform corresponding functions according one or more embodiments of the present disclosure.

While processes in the figures may show a particular order of operations performed by certain embodiments of the present disclosure, it should be understood that such order is exemplary (e.g., alternative embodiments may perform the operations in a different order, combine certain operations, overlap certain operations, etc.).

Some exemplary embodiments of the present disclosure are as follows.

Embodiment 1: A method performed by a wireless device for reducing energy consumption in the wireless device. The method includes providing (400) an indication(s) to a network node (e.g., a base station), the indication(s) being an explicit or implicit indication(s) that the wireless device (e.g., a UE) will prioritize energy consumption reduction over other network requirements (e.g., latency and/or scheduling flexibility). The method also includes performing (402) one or more power-saving actions to reduce energy consumption in the wireless device after providing the indication(s) to the network.

Embodiment 2: The method of embodiment 1, wherein providing (400) the indication(s) comprises providing (400) a power-saving indication during random-access procedure (e.g., using random-access preambles configured by the network or indicate in Msg3) (e.g., where the power-saving indication is an explicit indication that the wireless device (e.g., a UE) will prioritize energy consumption reduction over other network requirements (e.g., latency and/or scheduling flexibility)).

Embodiment 3: The method of embodiment 1, wherein providing (400) the indication(s) comprises providing (400) the indication e.g., as an explicit power-saving indication) during certain services initiated by the wireless device (e.g., use EDT during random-access procedures, include data in MsgA during 2-step RACH, or use PUR).

Embodiment 4: The method of embodiment 1, wherein a power-saving indication can be derived from the indication(s) provided to the network node.

Embodiment 4A: The method of embodiment 4, wherein the indication(s) comprise a delay tolerant indication, a small data indication, a NR-REDCAP UE capability indication, a UE type indication, a service type indication, a QoS configuration or network slice information, an indication for a specific PDCCH monitoring capability, or a power-preference indicator).

Embodiment 4B: The method of embodiment 4 or 4A, wherein the indication(s) is configured to provide further information regarding an expected type of traffic or allowed requirements (e.g., in a specific use case).

Embodiment 5: The method of any one of embodiments 1 to 4B wherein performing 202) the one or more power-saving actions comprises: (a) reducing PDCCH monitoring such that energy consumption in the wireless device is reduced, (b) reducing on-time such that energy consumption in the wireless device is reduced, or (c) both (a) and (b).

Embodiment 6: The method of any one of embodiments 1 to 5, wherein performing the one or more power-saving actions (402) further comprises performing one or more of the following actions:
  applying a DRX cycle during an RA window, a contention window, a 2-step RACH MsgB-receptionWindow, a PUR configured grant search space window, or an HARQ RTT timer duration;
  employing a different ra-ResponseWindow or a different ra-ContentionWindow from default configuration;
  decoding a lesser number of random-access-responses (RARs);
  not monitoring PDCCH for a configurable amount of time;
  monitoring PDCCH for a shortened duration;
  limiting a number of CORESETs monitored by the wireless device or configuring a narrower bandwidth for CORESET;
  limiting a number of secondary carriers or supplementary uplinks the wireless device needs to consider; and
  performing a reduced number of BD and/or channel estimation Embodiment 7: The method of any one of embodiments 1 to 6, further comprising providing user data and forwarding the user data to a host computer via the transmission to the base station.

Embodiment 8: A method performed by a base station for reducing energy consumption in a wireless device. The method includes receiving (500) an indication(s) from a wireless device (e.g., a UE) that explicitly or implicitly indicates that the wireless device will prioritize energy consumption reduction over other network requirements (e.g., latency and/or scheduling flexibility). The method also includes performing (502) one or more network-related actions to assist the wireless device to reduce energy consumption in response to receiving the indication(s) from the wireless device.

Embodiment 9: The method of embodiment 8, wherein the step of performing one or more network-related actions to assist the wireless device to reduce energy consumption comprises:
  not scrambling a DCI with identical RA-RNTI such that the wireless device can avoid decoding a corresponding RAR transmission;
  providing a second indication in the DCI (e.g., DCIPeriodicityOffset) to indicate how many RARs will be scheduled next with identical service indication such that the wireless device can avoid decoding a subsequent PDCCH and RAR(s); and
  buffering data destined to the wireless device when the wireless device does not monitor PDCCH for a configurable amount of time (e.g., DelayedDeliveryTimer);
  providing the wireless device with a separate CSS and/or USS sparser configuration with less frequent PDCCH monitoring periodicity;
  limiting a number of CORESETs the wireless device must monitor or configure a narrower bandwidth for the CORESETs; and
  limiting a number of secondary carriers or supplementary uplinks the wireless device needs to consider.

Embodiment 10: The method of any of embodiments 8 to 9, further comprising obtaining user data and forwarding the user data to a host computer or a wireless device.

Embodiment 11: A wireless device for reducing energy consumption in the wireless device, the wireless device comprising:
  processing circuitry configured to perform any of the steps of any of the embodiments 1 to 7; and
  power supply circuitry configured to supply power to the wireless device.

Embodiment 12: A base station for reducing energy consumption in a wireless device, the base station comprising:
  processing circuitry configured to perform any of the steps of any of the embodiments 8 to 10; and
  power supply circuitry configured to supply power to the base station.

Embodiment 13: A User Equipment, UE, for reducing energy consumption, the UE comprising:
  an antenna configured to send and receive wireless signals;
  radio front-end circuitry connected to the antenna and to processing circuitry, and configured to condition signals communicated between the antenna and the processing circuitry;
  the processing circuitry being configured to perform any of the steps of any of the Group A embodiments;
  an input interface connected to the processing circuitry and configured to allow input of information into the UE to be processed by the processing circuitry;
  an output interface connected to the processing circuitry and configured to output information from the UE that has been processed by the processing circuitry; and
  a battery connected to the processing circuitry and configured to supply power to the UE.

Embodiment 14: A communication system including a host computer comprising:

processing circuitry configured to provide user data; and a communication interface configured to forward the user data to a cellular network for transmission to a User Equipment, UE;

wherein the cellular network comprises a base station having a radio interface and processing circuitry, the base station's processing circuitry configured to perform any of the steps of any of the Group B embodiments.

Embodiment 15: The communication system of embodiment 14 further including the base station.

Embodiment 16: The communication system of embodiments 14 and 15, further including the UE, wherein the UE is configured to communicate with the base station.

Embodiment 17: The communication system of embodiments 14 to 16, wherein:

the processing circuitry of the host computer is configured to execute a host application, thereby providing the user data; and the UE comprises processing circuitry configured to execute a client application associated with the host application.

Embodiment 18: A method implemented in a communication system including a host computer, a base station, and a User Equipment, UE, the method comprising:

at the host computer, providing user data; and at the host computer, initiating a transmission carrying the user data to the UE via a cellular network comprising the base station, wherein the base station performs any of the steps of any of the Group B embodiments.

Embodiment 19: The method of embodiment 18, further comprising, at the base station, transmitting the user data.

Embodiment 20: The method of embodiments 18 and 19, wherein the user data is provided at the host computer by executing a host application, the method further comprising, at the UE, executing a client application associated with the host application.

Embodiment 21: A User Equipment, UE, configured to communicate with a base station, the UE comprising a radio interface and processing circuitry configured to perform the method of embodiments 18 to 20.

Embodiment 22: A communication system including a host computer comprising:

processing circuitry configured to provide user data; and a communication interface configured to forward user data to a cellular network for transmission to a User Equipment, UE;

wherein the UE comprises a radio interface and processing circuitry, the UE's components configured to perform any of the steps of any of the Group A embodiments.

Embodiment 23: The communication system of embodiment, 22 wherein the cellular network further includes a base station configured to communicate with the UE.

Embodiment 24: The communication system of embodiments 22 and 23, wherein:

the processing circuitry of the host computer is configured to execute a host application, thereby providing the user data; and the UE's processing circuitry is configured to execute a client application associated with the host application.

Embodiment 25: A method implemented in a communication system including a host computer, a base station, and a User Equipment, UE, the method comprising:

at the host computer, providing user data; and at the host computer, initiating a transmission carrying the user data to the UE via a cellular network comprising the base station, wherein the UE performs any of the steps of any of the embodiments 1 to 7.

Embodiment 26: The method of embodiment 25, further comprising at the UE, receiving the user data from the base station.

Embodiment 27: A communication system including a host computer comprising:

a communication interface configured to receive user data originating from a transmission from a User Equipment, UE, to a base station;

wherein the UE comprises a radio interface and processing circuitry, the UE's processing circuitry configured to perform any of the steps of any of embodiments 1 to 7.

Embodiment 28: The communication system of embodiment 27, further including the UE.

Embodiment 29: The communication system of embodiments 27 and 28, further including the base station, wherein the base station comprises a radio interface configured to communicate with the UE and a communication interface configured to forward to the host computer the user data carried by a transmission from the UE to the base station.

Embodiment 30: The communication system of embodiments 27 to 29, wherein:

the processing circuitry of the host computer is configured to execute a host application; and the UE's processing circuitry is configured to execute a client application associated with the host application, thereby providing the user data.

Embodiment 31: The communication system of embodiments 27 to 30, wherein:

the processing circuitry of the host computer is configured to execute a host application, thereby providing request data; and the UE's processing circuitry is configured to execute a client application associated with the host application, thereby providing the user data in response to the request data.

Embodiment 32: A method implemented in a communication system including a host computer, a base station, and a User Equipment, UE, the method comprising: at the host computer, receiving user data transmitted to the base station from the UE, wherein the UE performs any of the steps of any of the embodiments 1 to 7.

Embodiment 33: The method of embodiment 32, further comprising, at the UE, providing the user data to the base station.

Embodiment 34: The method of embodiments 32 and 33, further comprising:

at the UE, executing a client application, thereby providing the user data to be transmitted; and at the host computer, executing a host application associated with the client application.

Embodiment 35: The method of embodiments 32 to 34, further comprising:

at the UE, executing a client application; and at the UE, receiving input data to the client application, the input data being provided at the host computer by executing a host application associated with the client application;

wherein the user data to be transmitted is provided by the client application in response to the input data.

Embodiment 36: A communication system including a host computer comprising a communication interface configured to receive user data originating from a transmission from a User Equipment, UE, to a base station, wherein the base station comprises a radio interface and processing circuitry, the base station's processing circuitry configured to perform any of the steps of any of the embodiments 8 to 10.

Embodiment 37: The communication system of the previous embodiment further including the base station.

Embodiment 38: The communication system of embodiments 36 and 37, further including the UE, wherein the UE is configured to communicate with the base station.

Embodiment 39: The communication system of embodiments 36 to 38, wherein:
 the processing circuitry of the host computer is configured to execute a host application; and
 the UE is configured to execute a client application associated with the host application, thereby providing the user data to be received by the host computer.

Embodiment 40: A method implemented in a communication system including a host computer, a base station, and a User Equipment, UE, the method comprising:
 at the host computer, receiving, from the base station, user data originating from a transmission which the base station has received from the UE, wherein the UE performs any of the steps of any of the embodiments 1 to 7.

Embodiment 41: The method of embodiment 40, further comprising at the base station, receiving the user data from the UE.

Embodiment 42: The method of embodiments 40 and 41, further comprising at the base station, initiating a transmission of the received user data to the host computer.

At least some of the following abbreviations may be used in this disclosure. If there is an inconsistency between abbreviations, preference should be given to how it is used above. If listed multiple times below, the first listing should be preferred over any subsequent listing(s).

3GPP Third Generation Partnership Project
5G Fifth Generation
5GC Fifth Generation Core
5GS Fifth Generation System
AF Application Function
AMF Access and Mobility Function
AN Access Network
AP Access Point
ASIC Application Specific Integrated Circuit
AUSF Authentication Server Function
BD Blind Decodes
CCE Control Channel Element
cMTC Critical Machine Type Communication
CORESET Control Resource Sets
CPU Central Processing Unit
CSS Common Search Space
DoNAS Data over Non-Access Stratum
DCI Downlink Control Information
DN Data Network
DRX Discontinuous Reception
DSP Digital Signal Processor
EDT Early Data Transmission
eMBB enhanced Mobile Broadband
eNB Enhanced or Evolved Node B
EPS Evolved Packet System
E-UTRA Evolved Universal Terrestrial Radio Access
FPGA Field Programmable Gate Array
gNB New Radio Base Station
gNB-DU New Radio Base Station Distributed Unit
HARQ Hybrid Automatic Repeat Request
HSS Home Subscriber Server
IoT Internet of Things
IP Internet Protocol
LPWA Low Power Wide Area
LTE Long Term Evolution
MAC Medium Access Control
MME Mobility Management Entity
mMTC Massive Machine-Type Communication
MTC Machine Type Communication
NEF Network Exposure Function
NF Network Function
NR New Radio
NRF Network Function Repository Function
NR-REDCAP Reduced Capability NR Device
NSSF Network Slice Selection Function
OTT Over-the-Top
PAR Packet Arrival Rates
PC Personal Computer
PCF Policy Control Function
PDCCH Physical Downlink Control Channel
P-GW Packet Data Network Gateway
PUR Preconfigured Uplink Resources
QoS Quality of Service
RACH Random Access Channel
RAM Random Access Memory
RAN Radio Access Network
RAR Random Access Responses
RA-RNTI Random Access Radio Network Temporary Identifier
ROM Read Only Memory
RRH Remote Radio Head
RU Round Trip Time
SCEF Service Capability Exposure Function
SMF Session Management Function
UDM Unified Data Management
UE User Equipment
UPF User Plane Function
URLLC Ultra-Reliable and Low Latency Communication
USS User Equipment Search Space Those skilled in the art will recognize improvements and modifications to the embodiments of the present disclosure. All such improvements and modifications are considered within the scope of the concepts disclosed herein.

The invention claimed is:

1. A method performed by a wireless device for reducing energy consumption in the wireless device, comprising:
 providing an indication to a network node to indicate that the wireless device will prioritize energy consumption reduction over one or more other network requirements; and
 performing one or more power-saving actions to reduce the energy consumption in the wireless device after providing the indication to the network node, wherein performing the one or more power-saving actions comprises:
 reducing Physical Downlink Control Channel, PDCCH, monitoring and/or PDCCH bandwidth of the wireless device; and
 wherein reducing the PDCCH monitoring and/or the PDCCH bandwidth of the wireless device further comprises applying a Discontinuous Reception, DRX, cycle during a Random Access, RA, window, a contention window, a 2-step Random Access Channel, RACH, MsgB receptionWindow, a Preconfigured Uplink Resource, PUR, configured grant search space window, or a Hybrid Automatic Repeat Request, HARQ, Round Trip Time, RTT, timer duration and wherein an offset of the DRX cycle is set in accordance with UE specific information, wherein the offset sets a beginning of the PDCCH monitoring to a particular time relative to a beginning of the DRX cycle.

2. The method of claim 1, wherein providing the indication to the network node comprises providing the indication explicitly as one or more of the following:
   a power-saving indication provided to the network node during a random-access procedure; and
   an indication provided to the network node during certain services initiated by the wireless device.

3. The method of claim 1, wherein providing the indication to the network node comprises providing the indication implicitly as one or more of the following:
   an indication derived from one or more of: a delay tolerant indication, a small data indication, a New Radio Reduced Capability, NR-REDCAP, User Equipment, UE, capability indication, a service type indication, a Quality of Service, QoS, configuration or network slice information, an indication for a specific PDCCH monitoring capability, and a power-preference indicator; and
   an indication configured to provide further information regarding an expected type of traffic or allowed requirements.

4. The method of claim 1, wherein performing the one or more power-saving actions further comprises:
   reducing on-time of the wireless device.

5. The method of claim 4, wherein performing the one or more power-saving actions further comprises performing one or more of the following:
   employing a different ra-Response Window or a different ra-ContentionWindow from a default configuration;
   decoding a lesser number of Random Access Responses, RARs;
   reducing bandwidth of PDCCH from a PDCCH configured for normal operations;
   not monitoring PDCCH for a configurable amount of time;
   monitoring PDCCH for a shortened duration;
   limiting a number of Control Resource Sets, CORESETs, monitored by the wireless device or configuring a narrower bandwidth for the CORESETs;
   limiting a number of secondary carriers or supplementary uplinks considered by the wireless device; and
   performing a reduced number of Blind Decodings, BD, and/or channel estimation.

6. The method of claim 1, wherein the one or more other network requirements comprise at least one of a latency requirement and a scheduling flexibility requirement.

7. A wireless device, comprising:
   processing circuitry and transceiver circuitry configured to cause the wireless device to:
      provide an indication to a network node to indicate that the wireless device will prioritize energy consumption reduction over one or more other network requirements; and
      perform one or more power-saving actions to reduce energy consumption in the wireless device after providing the indication to the network node, wherein performing the one or more power-saving actions comprises:
         reducing Physical Downlink Control Channel, PDCCH, monitoring and/or PDCCH bandwidth of the wireless device;
         wherein reducing the PDCCH monitoring and/or the PDCCH bandwidth of the wireless device further comprises applying a Discontinuous Reception, DRX, cycle during a Random Access, RA, window, a contention window, a 2-step Random Access Channel, RACH, MsgB receptionWindow, a Preconfigured Uplink Resource, PUR, configured grant search space window, or a Hybrid Automatic Repeat Request, HARQ, Round Trip Time, RTT, timer duration and wherein an offset of the DRX cycle is set in accordance with UE specific information, wherein the offset sets a beginning of the PDCCH monitoring to a particular time relative to a beginning of the DRX cycle; and
   power supply circuitry configured to supply power to the wireless device.

8. The wireless device of claim 7, wherein the indication is provided explicitly as one or more of the following:
   a power-saving indication provided to the network node during a random-access procedure; and
   an indication provided to the network node during certain services initiated by the wireless device.

9. The wireless device of claim 7, wherein the indication is provided implicitly as one or more of the following:
   an indication derived from one or more of: a delay tolerant indication, a small data indication, a New Radio Reduced Capability, NR-REDCAP, User Equipment, UE, capability indication, a service type indication, a Quality of Service, QoS, configuration or network slice information, an indication for a specific PDCCH monitoring capability, and a power-preference indicator; and
   an indication configured to provide further information regarding an expected type of traffic or allowed requirements.

10. The wireless device of claim 7, wherein the one or more power-saving actions further comprises:
    reducing on-time of the wireless device.

11. The wireless device of claim 10, wherein the one or more power-saving actions further comprise one or more of the following:
    employing a different ra-ResponseWindow or a different ra-ContentionWindow from a default configuration;
    decoding a lesser number of Random Access Responses, RARs;
    reducing bandwidth of PDCCH from a PDCCH configured for normal operations;
    not monitoring PDCCH for a configurable amount of time;
    monitoring PDCCH for a shortened duration;
    limiting a number of Control Resource Sets, CORESETs, monitored by the wireless device or configuring a narrower bandwidth for the CORESETs;
    limiting a number of secondary carriers or supplementary uplinks considered by the wireless device; and
    performing a reduced number of Blind Decodings, BD, and/or channel estimation.

12. The wireless device of claim 7, wherein the one or more other network requirements comprise at least one of a latency requirement and a scheduling flexibility requirement.

13. A method performed by a network node for reducing energy consumption in a wireless device, comprising:
- receiving an indication from the wireless device that indicates that the wireless device will prioritize energy consumption reduction over one or more other network requirements; and
- performing one or more network-related actions to assist the wireless device to reduce the energy consumption in response to receiving the indication from the wireless device, wherein performing the one or more network-related actions to assist the wireless device to reduce the energy consumption comprises:
  - configuring the wireless device to reduce Physical Downlink Control Channel, PDCCH, monitoring and/or PDCCH bandwidth of the wireless device; and
  - wherein reducing the PDCCH monitoring and/or the PDCCH bandwidth of the wireless device further comprises applying a Discontinuous Reception, DRX, cycle during a Random Access, RA, window, a contention window, a 2-step Random Access Channel, RACH, MsgB receptionWindow, a Preconfigured Uplink Resource, PUR, configured grant search space window, or a Hybrid Automatic Repeat Request, HARQ, Round Trip Time, RTT, timer duration and wherein an offset of the DRX cycle is set in accordance with UE specific information, wherein the offset sets a beginning of the PDCCH monitoring to a particular time relative to a beginning of the DRX cycle.

14. The method of claim 13, wherein receiving the indication from the wireless device comprises receiving the indication explicitly as one or more of the following:
- a power-saving indication provided to the network node during a random-access procedure of the wireless device; and
- an indication provided to the network node during certain services initiated by the wireless device.

15. The method of claim 13, wherein receiving the indication from the wireless device further comprises receiving the indication implicitly as one or more of the following:
- an indication derived from one or more of: a delay tolerant indication, a small data indication, a New Radio Reduced Capability, NR-REDCAP, User Equipment, UE, capability indication, a service type indication, a Quality of Service, QoS, configuration or network slice information, an indication for a specific PDCCH monitoring capability, and a power-preference indicator; and
- an indication configured to provide further information regarding an expected type of traffic or allowed requirements.

16. The method of claim 13, wherein performing the one or more network-related actions further comprises:
- configuring the wireless device to reduce on-time.

17. The method of claim 16, wherein performing the one or more network-related actions comprises performing one or more of the following:
- not scrambling a Downlink Control Information, DCI, with an identical Random Access Radio Network Temporary Identifier, RA-RNTI;
- providing a second indication in the DCI to indicate how many Packet Arrival Rates, PARs, will be scheduled next with identical service indication;
- buffering data destined to the wireless device when the wireless device does not monitor PDCCH for a configurable amount of time;
- providing the wireless device with a separate Common Search Space, CSS, and/or User Equipment, UE, Search Space, USS, sparser configuration with less frequent PDCCH monitoring periodicity;
- limiting a number of Control Resource Sets, CORESETs, the wireless device must monitor or configuring a narrower bandwidth for the CORESETs; and
- limiting a number of secondary carriers or supplementary uplinks the wireless device needs to consider.

18. The method of claim 13, wherein the one or more other network requirements comprise at least one of a latency requirement and a scheduling flexibility requirement.

* * * * *